US009772141B2

(12) United States Patent
Kaminski et al.

(10) Patent No.: US 9,772,141 B2
(45) Date of Patent: Sep. 26, 2017

(54) METHOD AND APPARATUS FOR RECLAIMING HEAT DURING LIQUID PURIFICATION USING HEAT EXCHANGES

(71) Applicant: WaterPointe-Global, LLC, San Francisco, CA (US)

(72) Inventors: Joseph W Kaminski, Campbell, CA (US); Charles J. Borg, San Francisco, CA (US); Dariush Golpira, Westlake Village, CA (US)

(73) Assignee: Waterpointe-Global, Campbell, CA (US)

( * ) Notice: Subject to any disclaimer, the term of this patent is extended or adjusted under 35 U.S.C. 154(b) by 1124 days.

(21) Appl. No.: 13/735,950

(22) Filed: Jan. 7, 2013

(65) Prior Publication Data

US 2013/0118714 A1 May 16, 2013

Related U.S. Application Data

(63) Continuation-in-part of application No. 13/214,114, filed on Aug. 19, 2011.

(51) Int. Cl.
*B01D 1/28* (2006.01)
*C02F 1/04* (2006.01)
(Continued)

(52) U.S. Cl.
CPC ............ *F28D 15/00* (2013.01); *B01D 1/289* (2013.01); *B01D 1/2887* (2013.01); *B01D 5/006* (2013.01);
(Continued)

(58) Field of Classification Search
CPC ........ B01D 1/2887; B01D 1/289; B01D 3/00; B01D 5/006; C02F 1/041
See application file for complete search history.

(56) References Cited

U.S. PATENT DOCUMENTS 4,671,856 A * 6/1987 Sears ..................... B01D 1/221
159/24.2
4,863,567 A * 9/1989 Raley ................... B01D 1/0017
165/88

(Continued)

OTHER PUBLICATIONS

Sun et al., "Modified Boundary Element Method for Radiative Heat Transfer Analyses in Emitting, Absorbing and Scattering Media", Integrated Engineering Software, Inc.

*Primary Examiner* — Jonathan Miller
(74) *Attorney, Agent, or Firm* — James M. Wu; JQ Law Group

(57) ABSTRACT

A system capable of providing a liquid purification process using heat regenerating or recovering via heat exchangers ("HEs"). The system, in one embodiment, includes a first set of thermal conductive channels ("TCC"), a second set of TCC, and a third set of TCC. The first set of TCC configured in a first HE is arranged in cylindrical shape which is able to surround or enclose a boiler. A function of TCC is to guide a liquid flow traveling through an HE. The second set of TCC configured in a second HE guides a second liquid flow traveling through the second HE. The third liquid flow such as a cold water stream, for example, flows through the third set of TCC adjacent to the first set of TCC and extracts heat from the first liquid flow such as hot purified water via TCC.

20 Claims, 31 Drawing Sheets

(51) Int. Cl.
*F28D 15/00* (2006.01)
*B01D 5/00* (2006.01)
*F28F 1/00* (2006.01)
*F28D 7/10* (2006.01)
*F28D 7/16* (2006.01)
*F28D 21/00* (2006.01)
*F28F 9/22* (2006.01)

(52) U.S. Cl.
CPC ............... *C02F 1/041* (2013.01); *F28D 7/103* (2013.01); *F28D 7/1615* (2013.01); *F28D 21/0012* (2013.01); *F28F 1/00* (2013.01); *F28F 2009/228* (2013.01); *Y02P 70/34* (2015.11); *Y02W 10/37* (2015.05)

(56) References Cited

U.S. PATENT DOCUMENTS

| | | | |
|---|---|---|---|
| 4,869,067 A * | 9/1989 | Sears | B01D 1/221 165/138 |
| 5,445,216 A * | 8/1995 | Cannata | F28D 9/04 165/120 |
| 6,623,603 B1 * | 9/2003 | Call | C02F 1/048 159/18 |
| 6,689,251 B2 * | 2/2004 | Zebuhr | B01D 1/2887 159/24.1 |
| 6,695,951 B1 * | 2/2004 | Bitterly | B01D 1/222 159/13.2 |
| 6,908,533 B2 * | 6/2005 | Zebuhr | B01D 3/08 159/24.1 |
| 7,381,310 B2 * | 6/2008 | Hernandez et al. | B01D 1/16 159/43.1 |
| 7,427,336 B2 * | 9/2008 | Zebuhr | B01D 1/223 159/28.6 |
| 7,597,784 B2 * | 10/2009 | Bednarek | B01D 1/221 159/24.1 |
| 8,858,758 B2 * | 10/2014 | Zebuhr | B01D 1/225 159/49 |
| 2008/0237026 A1 * | 10/2008 | Zebuhr | B01D 3/12 202/182 |

* cited by examiner

*twelve flutes assembly*

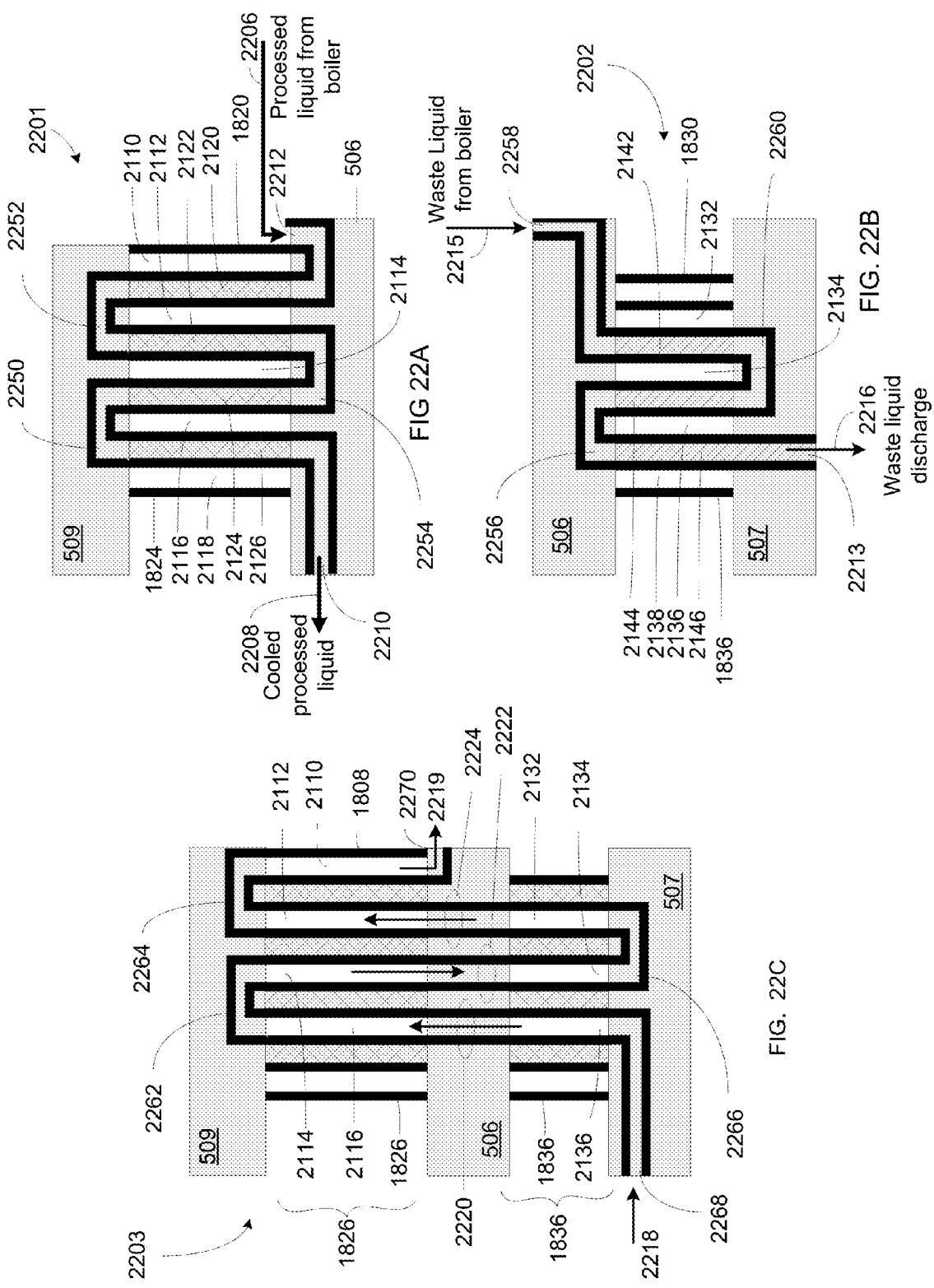

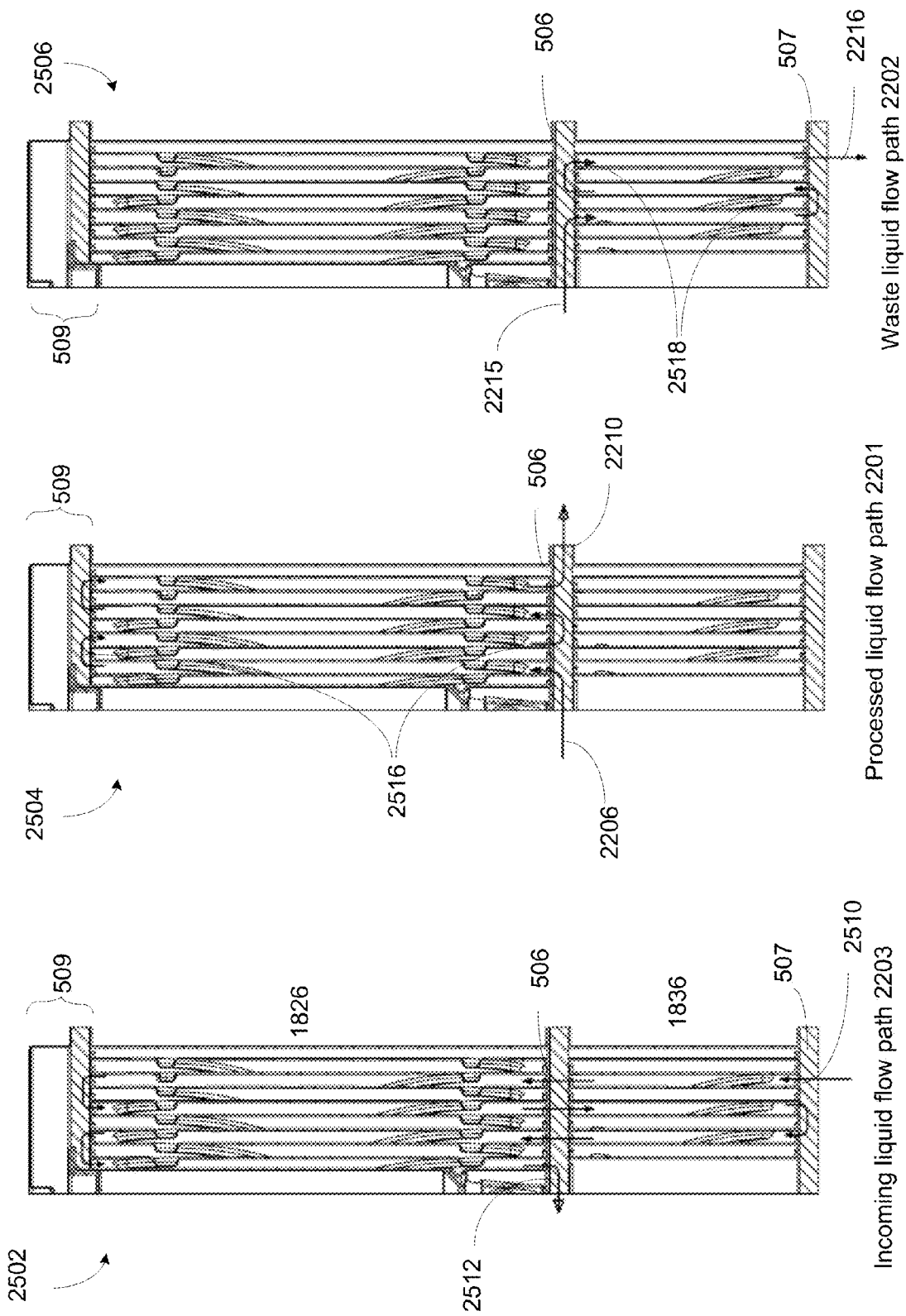

METHOD AND APPARATUS FOR RECLAIMING HEAT DURING LIQUID PURIFICATION USING HEAT EXCHANGES

PRIORITY

This patent application is a continuous-in-part (CIP) application of co-pending U.S. patent application Ser. No. 13/214,114, entitled "METHODS AND APPARATUS FOR PURIFYING LIQUID USING REGENERATING HEAT EXCHANGE," filed on Aug. 19, 2011, the disclosure of which is incorporated herein by reference.

FIELD

The exemplary embodiment(s) of the present invention relates to heat purification process. More specifically, the exemplary embodiment(s) of the present invention relates to heat recovery process.

BACKGROUND

Clean water is critical to all life forms including humans or animal on this planet. With enhanced technology and information technology in recent years, demand of consumable drinking water or high quality drinkable water is steadily increasing across the globe. For example, readily available clean drinkable water can reduce disease, epidemic, poverty, and/or conflict throughout the world. With increasing world population and finite amount of clean water, demand of high quality clean water will continue in the future.

The standards for drinking water are typically set by governments, local authorities, or industry associations, and such standards typically set limits of maximum amount of contaminants that could have in the water but still safe for human consumption. To provide clean water, various water purification techniques have been developed over the years. For example, conventional purification systems include carbon filtration, membrane filtration, chlorination, ion exchange, oxidation, and/or reverse osmosis. A drawback associated with such techniques is that conventional purification techniques may require numerous treatment steps in order to be able to remove contaminants, such as living organisms, bacteria, viruses, arsenic, lead, and mercury.

A typical approach to solve the conventional purification system is to use vapor distillation process to purify water. A problem associated with a typical water distiller is that they are large, costly, and inefficient. For example, a conventional water distiller consumes large amount of energy such as electricity to produce small amount clean or distilled water. Another problem associated with a typical household or laboratory water distiller is that it takes hours to produce one gallon of clean water. Another drawback associated with a conventional temperature based purification system is heat loss during the process of liquid purification.

SUMMARY

A liquid processing system or heat reclaim purification ("HRP") system discloses a purification process with heat regenerating using one or more heat exchangers. The HRP system, in one embodiment, containing a heat reclaiming device or heat exchanger(s) includes a first set of thermal conductive channels ("TCC"), a second set of TCC, and a third set of TCC. The first set of TCC configured in a first heat exchanger ("HE") is arranged in cylindrical shape able to enclose or surround a main boiler. A function of the first set of TCC is to guide a first liquid flow to flow through the first HE. The second set of TCC configured in a second HE is also arranged in cylindrical shape and is able to guide a second liquid flow to flow through the second HE. The third set of TCC, which is configured to thermally couple to the first and second sets of TCC, guides a third liquid flow to flow through the first and the second HEs. In one aspect, the third liquid flow, which is a cold water stream, flows through the third set of TCC adjacent to the first set of TCC and extracts heat from the first liquid flow such as a hot purified water, via the first set of TCC and the third set of TCC. A manifold is used to provide some separation between the first HE and second HE.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 22A-C are diagrams illustrating thermal conductive channels ("TCC") in an HE for heat recovery in accordance with one embodiment of the present invention;

FIG. 25 shows diagrams illustrating cross-section side views of HE showing hot and cold flows within the HE in accordance with one embodiment of the present invention;

DETAILED DESCRIPTION

Figure 1A:
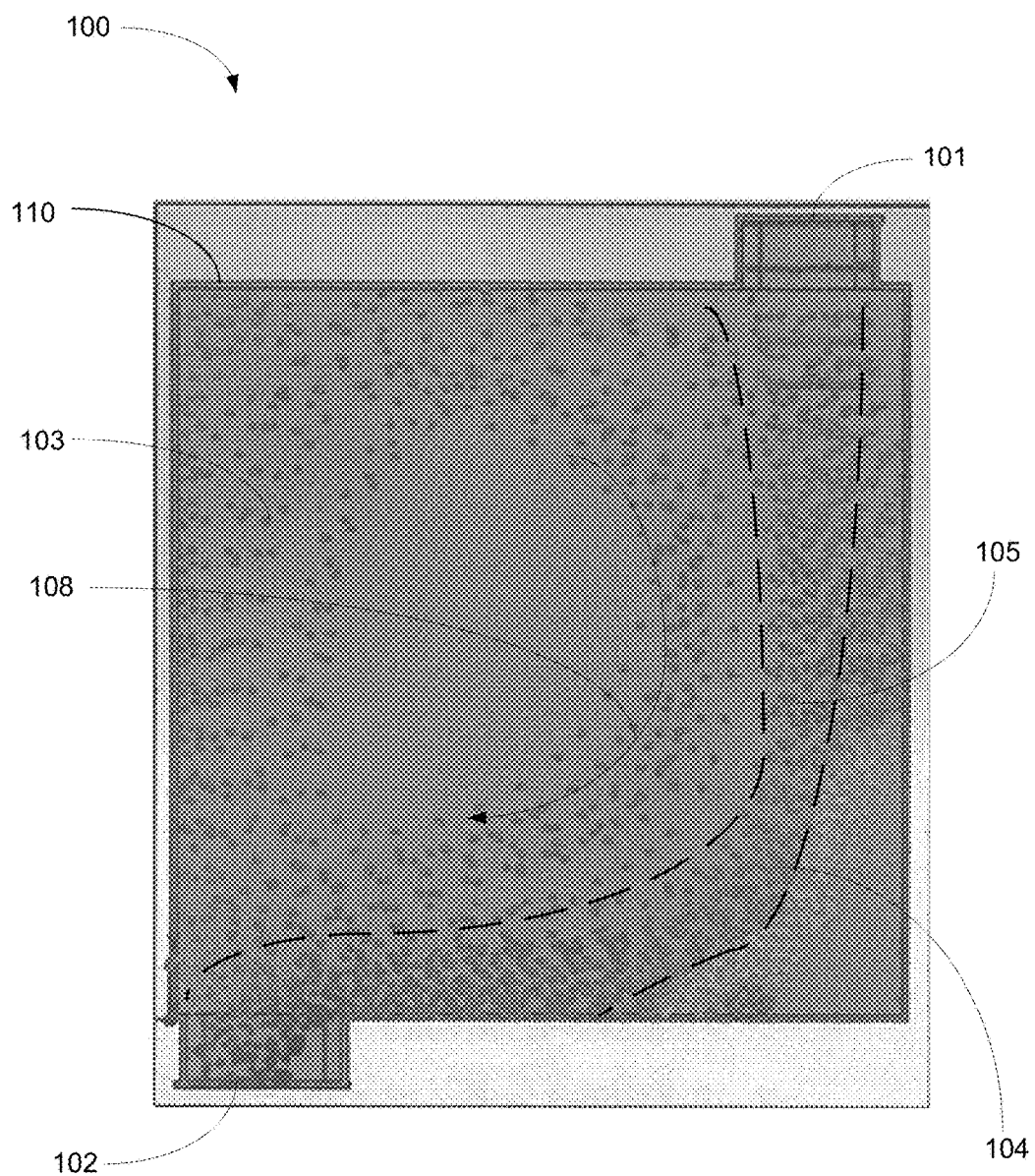
FIGS. 1A-C are diagrams illustrating an exemplary heat profile during a liquid purification process in accordance with one embodiment of the present invention.

Exemplary embodiment(s) of the present invention is described herein in the context of a method, device, and apparatus for purifying liquid using heat recovery mechanism to achieve optimal energy efficiency.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of mechanical components, elements, subsystems, devices, units, assemblies, mechanisms, or combinations of components thereof. The term "circuits," "computer," "integrated circuits," "electrical controller," "optical sensors," or "sensors," may include a processor, memory, and buses capable of executing instruction wherein the computer refers to one or a cluster of computers, personal computers, or combinations of computers thereof. The term "purifying" is used generically herein to describe reducing or altering concentration of one or more contaminants to a specified range.

Heat Reclaim Purification ("HRP") System

Embodiments of the present invention discloses a liquid or water purification apparatus capable of purifying liquid or water using regenerative heat exchanger. The apparatus includes a liquid receptacle, a heat exchanger, a heating mechanism, a compressor, and a condenser. The liquid receptacle, for example, is able to receive a stream of liquid such as water or liquor. In one embodiment, the liquid receptacle includes a water-input receptacle capable of receiving a flow or stream of water from an external device. The stream of water, for example, is pressurized having a range from two (2) pounds per square inch ("PSI") to 500 PSI. The water has a molecular structure of one oxygen and two hydrogen atoms connected by covalent bonds ("$H_2O$").

The heat exchanger, in one aspect, pushes or forces the received stream of liquid through the heat exchanger to preheat or increase the temperature of the liquid via at least a portion of processed liquid. The heat exchanger further includes a top or main heat exchanger and a bottom heat exchanger. While the top heat exchanger is configured to preheat incoming water with the purified water, the bottom heat exchanger preheats incoming water with the discarded water. Alternatively, the top heat exchanger is also configured to extract heat from purified water with incoming water before the purified water leaves the apparatus. The bottom heat exchanger cools down discarded water with incoming water before the discarded water leaves the apparatus as waste water.

The heating mechanism generates heat to facilitate phase transition from liquid to vapor. In one embodiment, the heating mechanism has a heater configured to heat water to a boiling point to separate purified water from impurities.

The heating mechanism includes a heater, such as a burner, a magnetic inductance heat generator, resistance heating element, et cetera.

The compressor guides or forces the vapor through the condenser, wherein the compressor includes a turbine operable to create a directional vapor whirlpool inside of a boiler to force the vapor into the condenser. In one embodiment, the compressor creates a vacuum to alter the boiling point for the liquid or water to speed up the separation of purified water from incoming water.

The condenser condenses vapor into liquid or purified liquid before it leaves the apparatus. The condenser further includes a set of blades or flutes wherein each blade is shaped in such a way that it optimizes liquid condensation from vapor to purified water. In one embodiment, the liquid purification apparatus also includes a housing which is configured to house the heat exchanger which is configured to fit both the compressor and condenser in the middle of heat exchanger.

FIG. 1A is a diagram illustrating an exemplary heat profile or temperature profile during a liquid purification process in accordance with one embodiment of the present invention. Diagram illustrates a cross-section side view of a heat reclaim purification (HRP) system 100 capable of processing or purifying liquid, such as water, or any other liquid that could be purified by distillation process. HRP system 100 includes a condenser 110 having an input port 101 and an output port 102 wherein input port 101 receives gas such as water vapor while output port 102 releases processed liquid such as purified water. It should be noted that the underlying concept of the exemplary embodiment(s) of the present invention would not change if one or more components (or blocks) were added to or removed from diagram 100.

FIG. 1A illustrates a computer simulated heat or temperature profile of HRP system 100 during a water purification process using regenerative heat exchanger wherein the water vapor or vapor enters input port 101. In one embodiment, when water vapor is being rushed or forced into condenser 110 as a fast moving vapor jet or stream via a compressor, not shown in FIG. 1A, the fast moving vapor creates a directional vapor whirlpool 108 inside the condenser. The heat profile illustrates a main stream of directional vapor jet 105 moving from input port 101 to output port 102. The warmest or hottest area of the heat profile, in one aspect, is indicated by numeral 104 while the coolest area is indicated by numeral 103. In one aspect of the present invention, condenser 110 is able to produce purified water in accordance with the heat profile, and is capable of recapturing, regenerating, or reclaiming heat (or energy) released from phase transition between vapor and liquid. For example, vapor stream entering from input port 101 and exiting output port 102 as liquid gives off heat during the phase transition.

A regenerative heat exchanger facilitates two flows or streams of fluid or liquid such as coming water and exiting purified water to flow through a heat exchanger in logically opposite direction or in a configuration of countercurrent exchanger. The heat exchanger having components, such as pipes, tubes, and/or channels, is able to maintain two moving flows separated while physically adjacent with each other to facilitate heat exchange. The heat or temperature profile may remain at a nearly constant temperature which includes the entering flow (cold or ambient water) and exiting flow at each end. In regenerative heat exchangers, in one example, uses a cyclical and/or repetitive treatment or process to preheat the incoming cold water via heat released by the processed water. The processed water includes purified water and discarded water. The discarded water is also known as waste water which contains relatively high concentration of impurities.

To operate, incoming cold water enters the heat exchanger and is preheated by heat extracted from processed water exiting the heat exchanger. The regenerative heat exchanger is able to conserve energy since a large amount of the heat energy is reclaimed or recaptured in a thermodynamically reversible way. Depending on the applications, the heat exchanger can have a range of thermal efficiency from 50% to 95% by transferring heat energy from a hot directional water flow to a cold directional water flow.

Figure 1B:
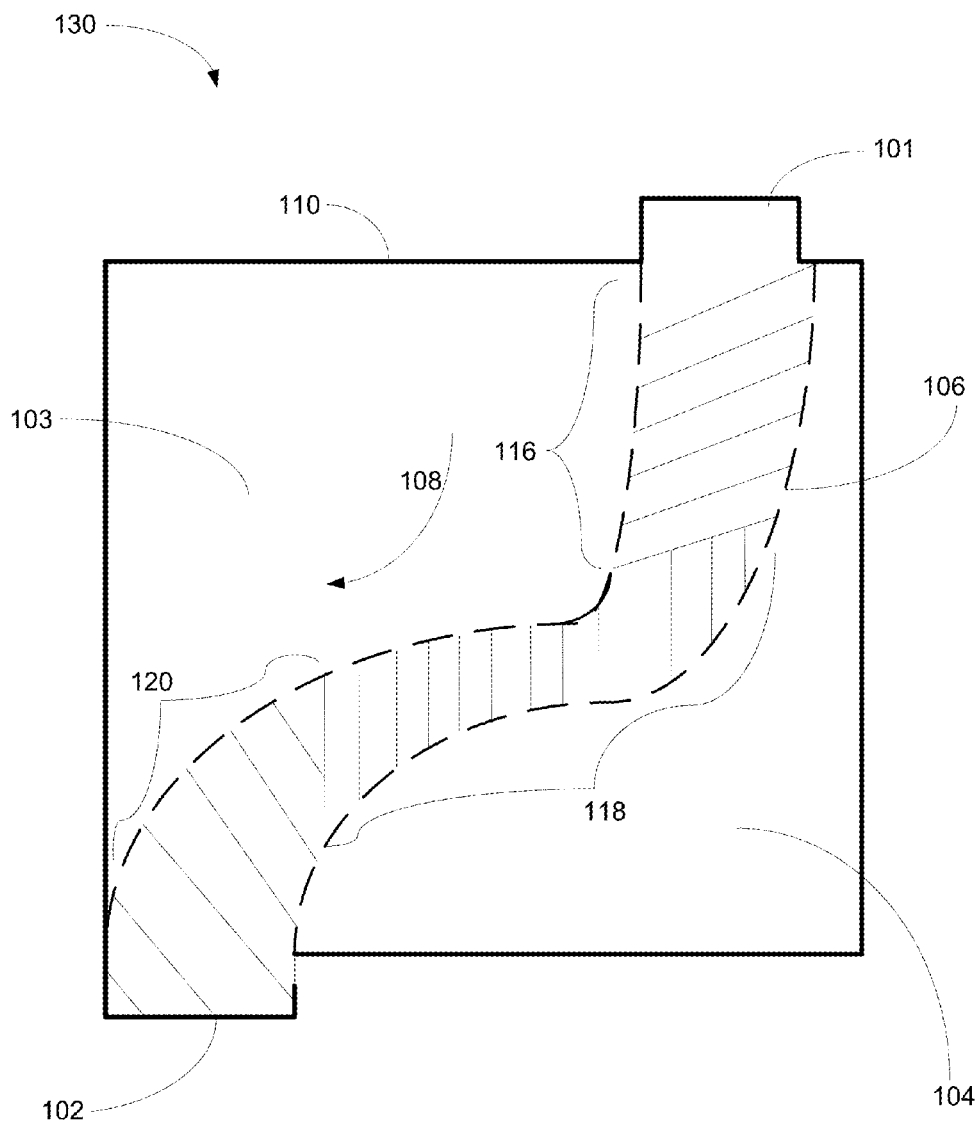

To condense vapor into purified water in accordance with the heat profile as illustrated in FIG. 1A, condenser 110 employs multiple blades or flutes 106 according to main stream of directional vapor jet 105 as illustrated in FIG. 1B. In one embodiment, blade 106 includes vapor section 116, phase changing section 118, and liquid section 120, wherein the phase changing section 118 releases heat since the water molecule gives off energy when it transforms its physical formation from vapor (or gas formation) to liquid (or fluid formation). Depending on the applications, the shape of blade or flutes 106 may change in accordance with the vapor jet. It should be noted that the term "blade" and "flute" are used interchangeably herein. Also, the term "vapor" and "water vapor" are used interchangeably herein.

Water is a chemical substance having a chemical formula $H_2O$ wherein its molecule structure contains one oxygen and two hydrogen atoms connected by covalent bonds. Depending on the temperature, water can be in different physical formation. For example, water is in a liquid formation at ambient or room temperature. Water is in vapor, steam, gas (or gaseous) formation when the temperature is at or above water's boiling point. It should be noted that the description uses water and/or water vapor as an exemplary chemical substance and the underlying concept of HRP system 100 is applicable to any other chemical substances capable of changing their physical formation in view of their boiling points as well as environmental pressure.

The boiling point of a chemical substance such as water is a temperature wherein vapor pressure of fluid is similar to surrounding or environmental pressure over the fluid or liquid. If the chemical substance in its liquid formation such as water, it has a lower boiling point in a low pressure or vacuum environment than when the water is at atmospheric pressure. Similarly, water or liquid has a higher boiling point in a high pressure surrounding than the water is at atmospheric pressure. As such, different chemical substance having different chemical compounds possesses different boiling points. Accordingly, the fluctuation of boiling point for a particular chemical substance such as water is a function of temperature and pressure.

Figure 1C:
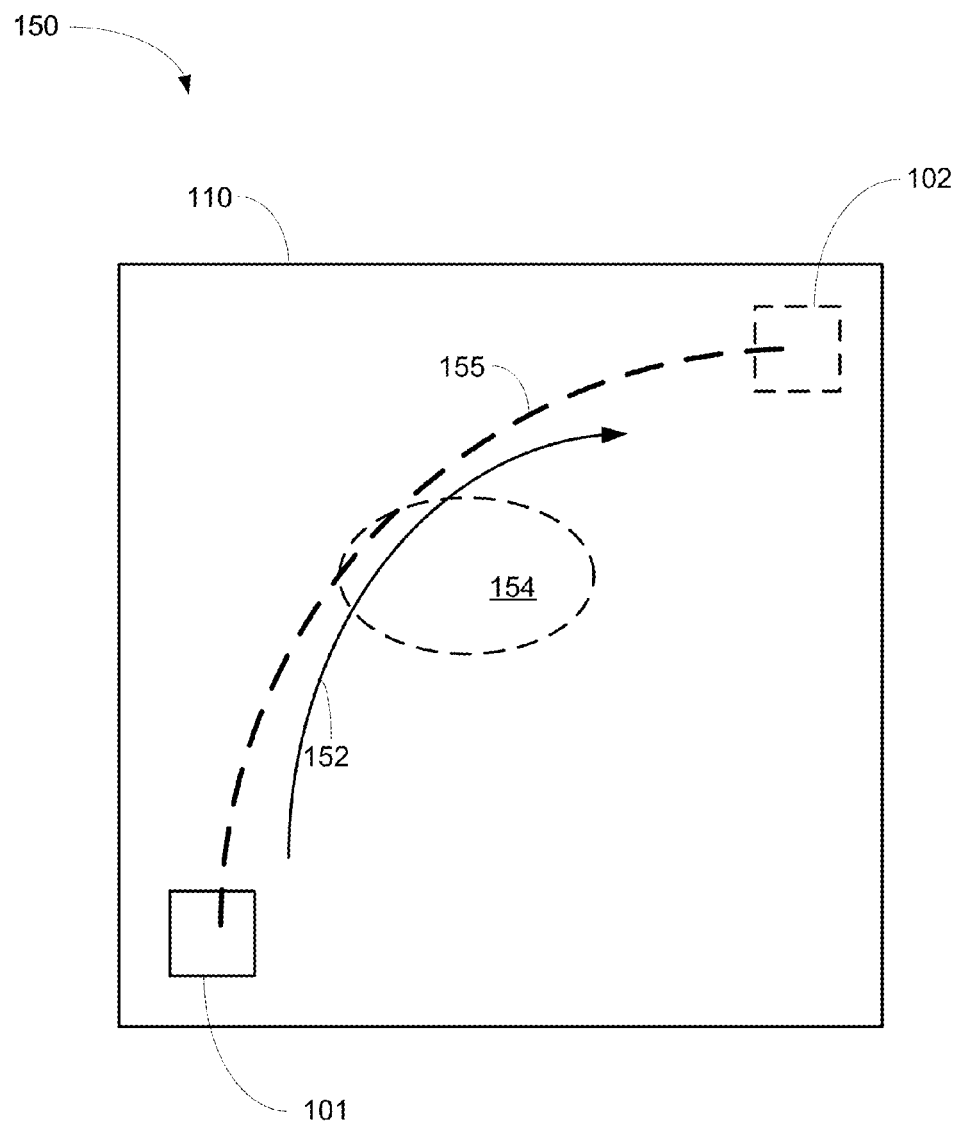

FIG. 1C is a diagram 150 illustrating a top view of the diagram in FIG. 1A showing an exemplary heat profile during a liquid purification process in accordance with one embodiment of the present invention. With respect to diagram 100, input port 101 is situated on the top of condenser 110 at the lower left corner while output port 102 is situated at the bottom of upper right corner of condenser 110. A directional steam or vapor jet 152 is formed whereby pressurized vapor jet entering input port 101 and exiting output port 102 according to a vapor flow traveling path 155. In one aspect, the heat exchange occurs at area 154 which is generally the hottest/warmest spot in the directional vapor jet 152. It should be noted that converting water into vapor requires sufficient energy required to vaporize water into vapor.

Figure 2:
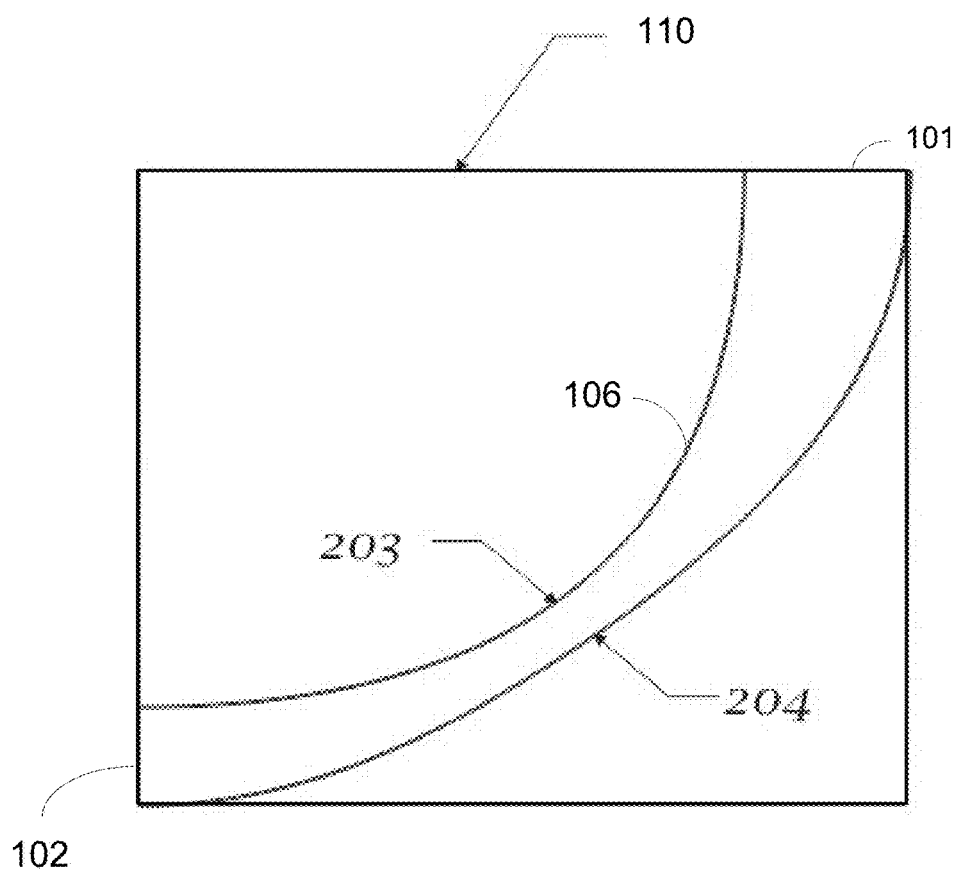
FIGS. 2-3 are diagrams illustrating configurations of blades or flutes for condensation in accordance with one embodiment of the present invention.
Figure 3:
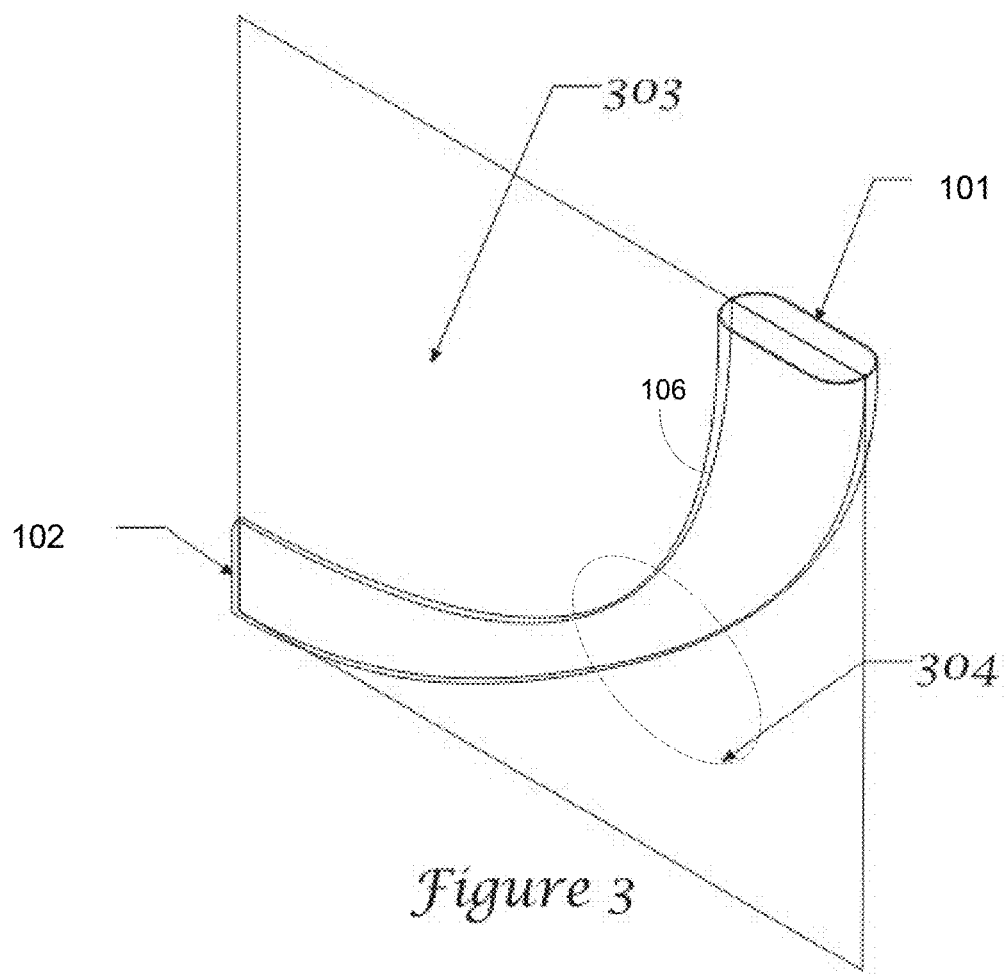

FIG. 2 illustrates condenser 110 having a blade 106 configured in accordance with one embodiment of the present invention. The shape of blade 106 is structured and/or configured in accordance with the shape of directional vapor jet 105 as shown in FIG. 1A. Blade 106 includes an input port 101 and an output port 102. Depending on the applications, the shape of blade 106 may vary. For example, a narrow section 203-204 of blade 106 may change depending on volume and speed of vapor flow. FIG. 3 illustrates a three dimensional ("3D") view of blade 106 with input port 101. In one aspect, the area pointed by numeral 304 is the warmest area while the area pointed by numeral 303 is the coolest in the condenser.

Figure 4:
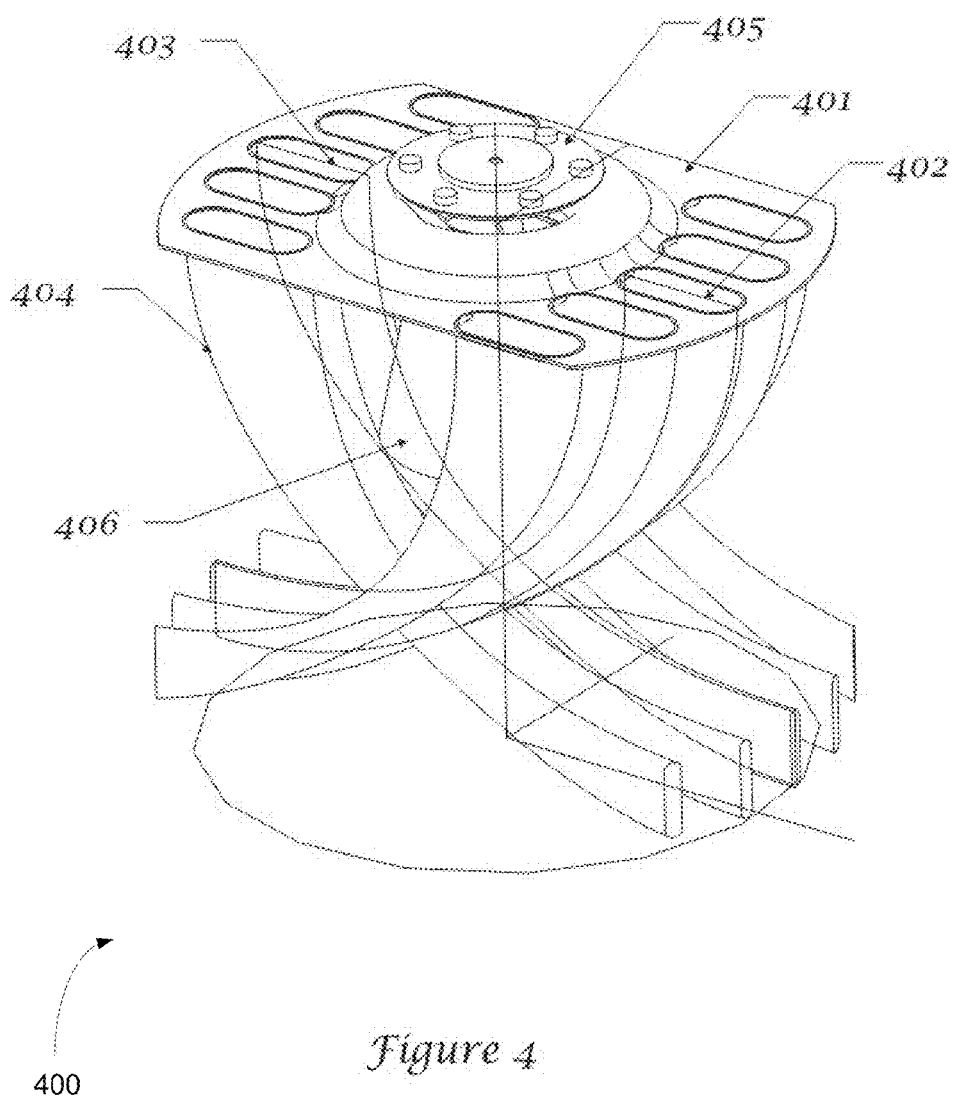
FIG. 4 is a diagram illustrating an isometric view of a turbine and condenser blades for liquid purification process in accordance with one embodiment of the present invention.

FIG. 4 is an isometric diagram 400 illustrating a turbine and condenser blades for liquid purification process in accordance with one embodiment of the present invention. Diagram 400 shows a structural layout between a turbine 405, multiple blades 404, and a flow guide 406. Turbine 405, in one embodiment, includes a motor and turbine blades configured to create a vacuum or low pressure area in the vicinity of flow guide 406. The motor and turbine blades, for example, can be fabricated by any applicable materials, such as aluminum, stainless steel, plastic, polymer, alloy, ceramic, and/or a combination of one or more of aluminum, stainless steel, plastic, polymer, alloy, and ceramic. The turbine provides a vacuum area above the incoming liquid (water) and reduces the boiling point of the liquid. The turbine acts as a compressor lowering the pressure whereby reducing boiling point of the liquid. A top plate 401 is used to anchor and/or secure turbine 405 as well as blades or flutes 404.

Flow guide 406, which may be in a cone shape, is configured in such a way that it creates and guides a directional vapor whirlpool between heat source, not shown in FIG. 4, and turbine 405 in response to the vacuum generated by turbine 405. During an operation, upon creation of the vacuum, one or more directional vapor flows are generated in accordance with the directional vapor whirlpool. The directional vapor flows are subsequently guided, pushed, and/or forced into input ports 402-403 of blades or flute 404. When vapor flows are highly compressed and pass through narrow portions of flutes 404, the physical phase transition takes place as vapor flows are condensed into purified water. The heat or energy released as a result of phase transition is added to the heat source to generate more vapors. Note that turbine 405 and flow guide 406 are at least part of compressor.

Figure 5:
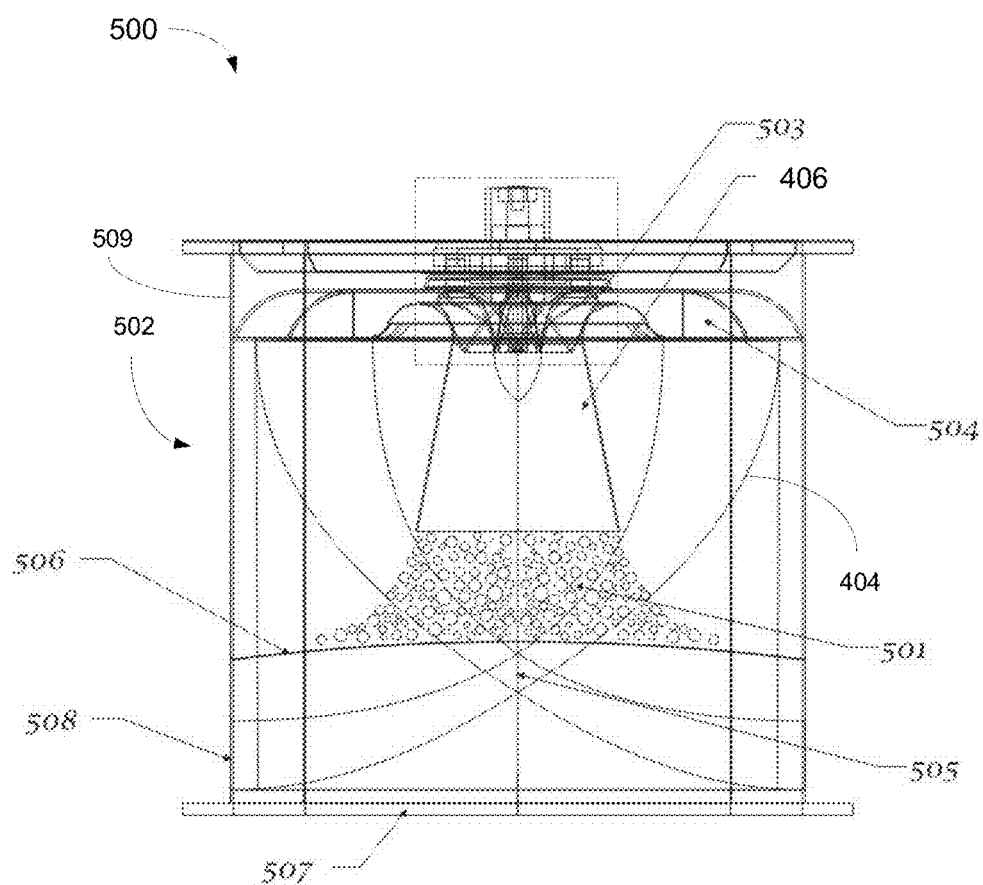
FIG. 5 is a diagram illustrating a cross-section view of liquid purification apparatus or system in accordance with one embodiment of the present invention.

FIG. 5 is a diagram 500 illustrating a cross-section view of liquid purification apparatus or HRP system in accordance with one embodiment of the present invention. Diagram 500 includes a main boiler 502, bottom boiler-collector 508, upper-manifold 509, center-manifold 506, and lower-manifold 507, wherein the manifolds are used to separate bottom boiler-collector 508 from main boiler 502. In one embodiment, main boiler 502 is used to process or produce purified water while bottom boiler-collector 508 is used to process or discard the waste water, substances with impurities, and/or discarded water. It should be noted that the underlying concept of the exemplary embodiment(s) of the present invention would not change if one or more components (or blocks) were added to or removed from diagram 500.

Upper-manifold 509 is coupled to turbine 503, blades 404, and flow guide 406. A function of upper-manifold 509 is to distribute vapor flows from main boiler 502 to blades 404 via various manifold channels 504 after vapor 501 is drawn up by turbine 503 from the bottom of main boiler 502 near the heat source to the top of main boiler 502. In an alternative embodiment, a compressor, which includes turbine 503 and flow guild 406, is coupled to upper-manifold 509 to create a vacuum area near the top of main boiler 502 for generating a directional vapor whirlpool.

The vapor flows are pressurized and condensed at the narrow regions of condenser blades 404 around epic center 505 which is the area that heat exchange occurs. In one aspect, epic center 505 is hottest or warmest area in main boiler 502. Epic center 505 is created when pressurized vapor flows through narrow portions of flutes 404 and the physical phase transition takes place around epic center 505. When vapor is condensed into purified water, heat or energy is released as a result of phase transition.

Figure 6A:
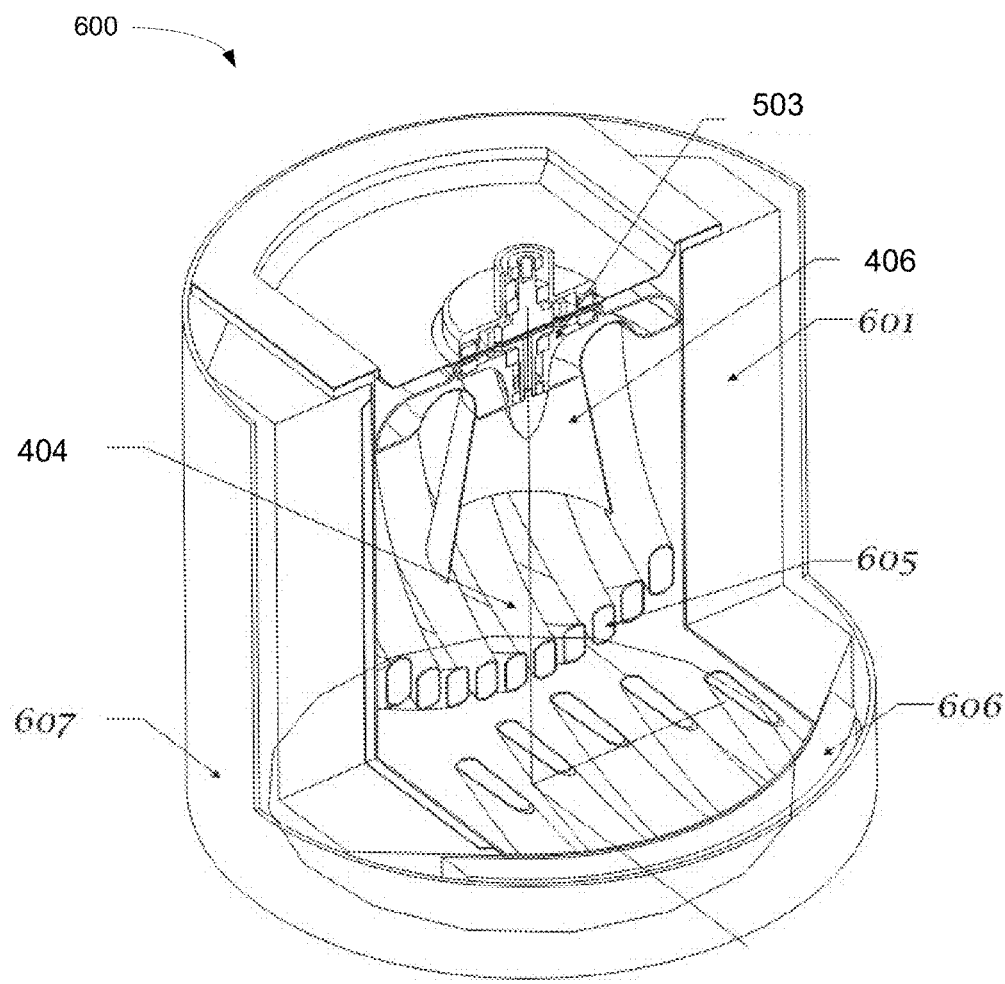
FIG. 6A is a diagram illustrating a cutaway perspective view of a liquid purification system using a heat regenerative mechanism in accordance with one embodiment of the present invention.

FIG. 6A is a diagram 600 illustrating a cutaway perspective view of HRP system using a heat regenerative mechanism in accordance with one embodiment of the present invention. Diagram 600 includes turbine 503, flow guide 406, blades 404, heat exchanger 601, bottom heat exchanger 606, and a housing 607, wherein housing 607 houses all components of HRP system. In one aspect, cut-open areas 605 of blades 404 are the epic center where larger amount of heat is generated by the phase transition or heat exchange. Heat exchanger 601 is used to extract heat from purified water as it flows out of the HRP system. The extracted heat is used to preheat the coming water. Bottom heat exchanger 606 is used to extract heat from waste water or liquid containing high concentration of impurities. Again, the extracted heat from the waste water is used to preheat the incoming cold water. The housing is outer element of heat exchangers 607 which is comprised of double-walled, vacuumed element. The housing element is used to provide mechanical and structure support for enclosed components, and also acts as a thermal energy rectifier and retainer.

Figure 6B:
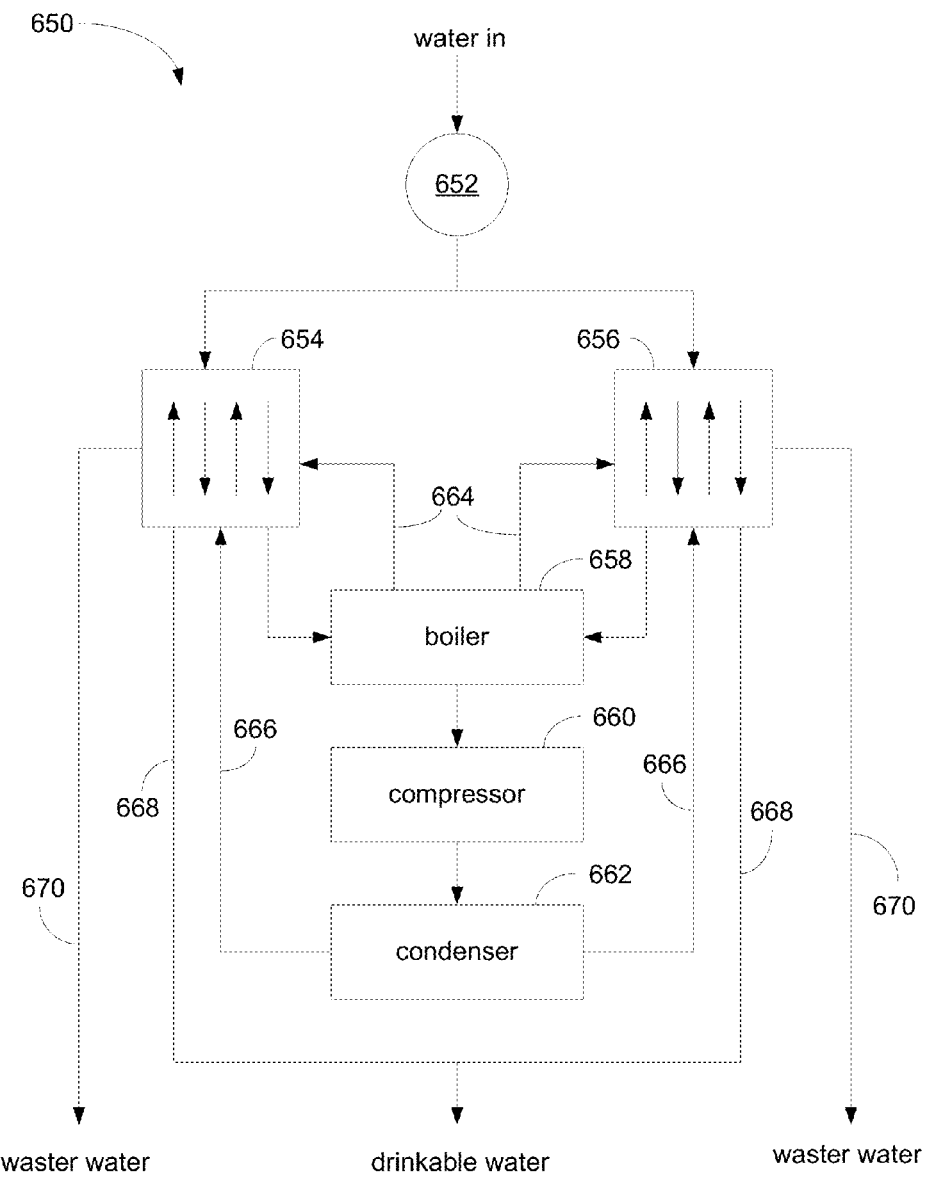
FIG. 6B is a logic block diagram illustrating an exemplary process of purifying liquid using heat regenerative mechanism in accordance with one embodiment of the present invention.

FIG. 6B is a logic block diagram 650 illustrating an exemplary process of purifying liquid using heat regenerative mechanism in accordance with one embodiment of the present invention. Diagram 650, which can be implemented in HRP system, includes a first heat exchanger 654, second heat exchanger 656, boiler 658, compressor 660, and condenser 662. In one aspect, first heat exchanger 654 is the main or top heat exchanger situated around the main boiler and second heat exchanger 656 is the bottom heat exchanger situated around the bottom boiler. It should be noted that the underlying concept of the exemplary embodiment(s) of the present invention would not change if one or more blocks were added to or removed from diagram 650.

In operation, when incoming water passes through a pump 652, the incoming water flows through both heat exchangers 654-656 to be preheated by the processed water. After flowing through heat exchangers 654-656, incoming water flows into boiler 658 to convert from water to steam or vapor via a heat source or a burner. Compressor 660 pushes or forces converted steam or vapor into condenser 662. The heavy (or waste) water or water containing high concentration of impurities flows back to heat exchangers 654-656 via channels 664 before it is being discarded via channel 670. Condenser 662 converts steam or vapor back into liquid or purified water and subsequently guides the purified water back to heat exchanger 654-656 via channels 666. Exchangers 654-656 extracts heat from purified water before allowing the purified water to exit the HRP system via channel 668.

It should be noted that, in addition to purifying water or liquid, exemplary process of purifying liquid using heat regenerative mechanism illustrated in FIG. 6B is applicable to any liquid substance purification process that uses vacuum, pressure and temperature as a controls of the environment for vapor condensation phase distillation.

Figure 7:
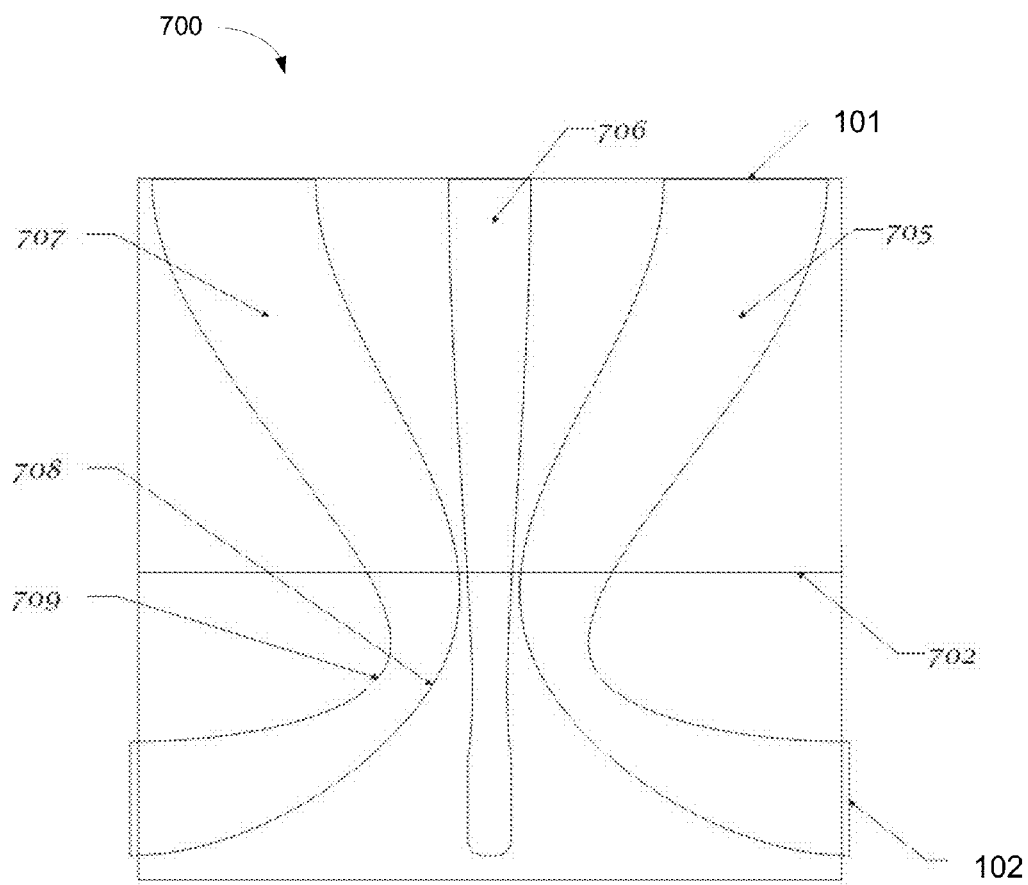
FIGS. 7-9 illustrate alternative designs or configurations to manufacture blades or flutes to achieve optimal heat exchange and vapor condensation in accordance with embodiments of the present invention.
Figure 8:
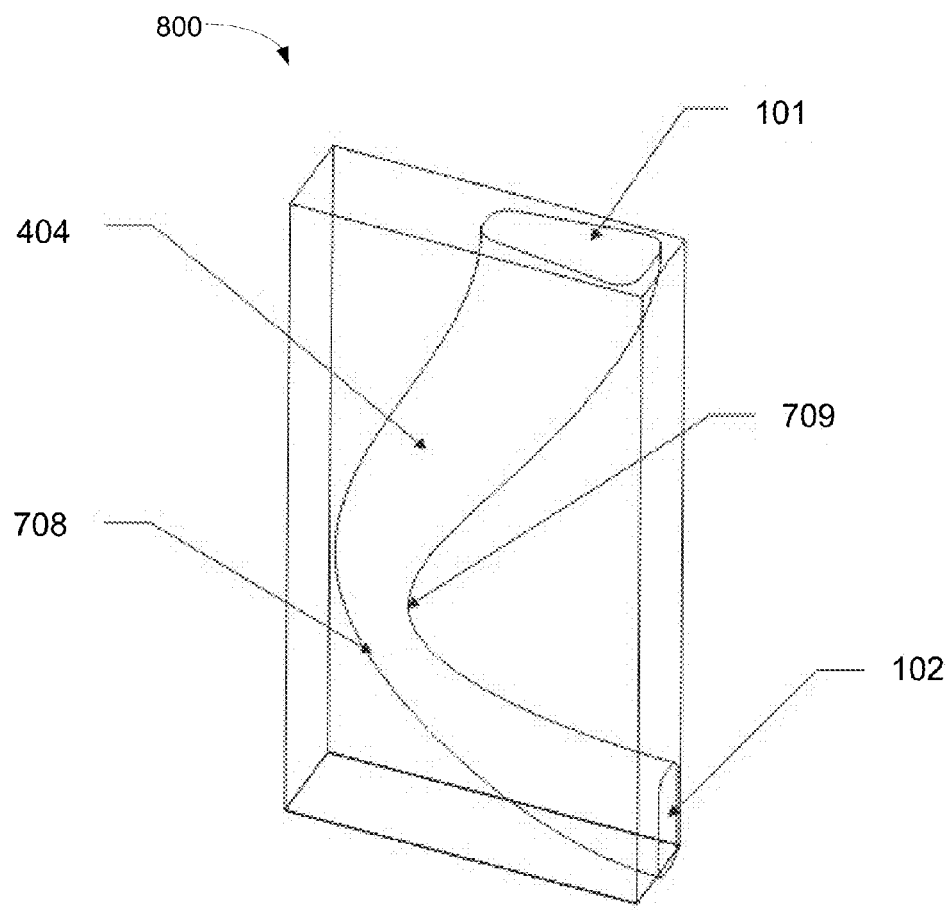

FIG. 7 is a diagram 700 illustrating an alternative design or configuration of blades or flutes to achieve optimal heat exchange and vapor condensation in accordance with embodiments of the present invention. Diagram 700 shows three (3) blades 705-707 wherein the distance between the points indicated by numeral 708-709 is application dependent. Line 720 indicates an area for phase transition between steam and water. FIG. 8 illustrates a 3D perspective view showing a blade which is similar to the blade shown in FIG. 7.

Figure 9:
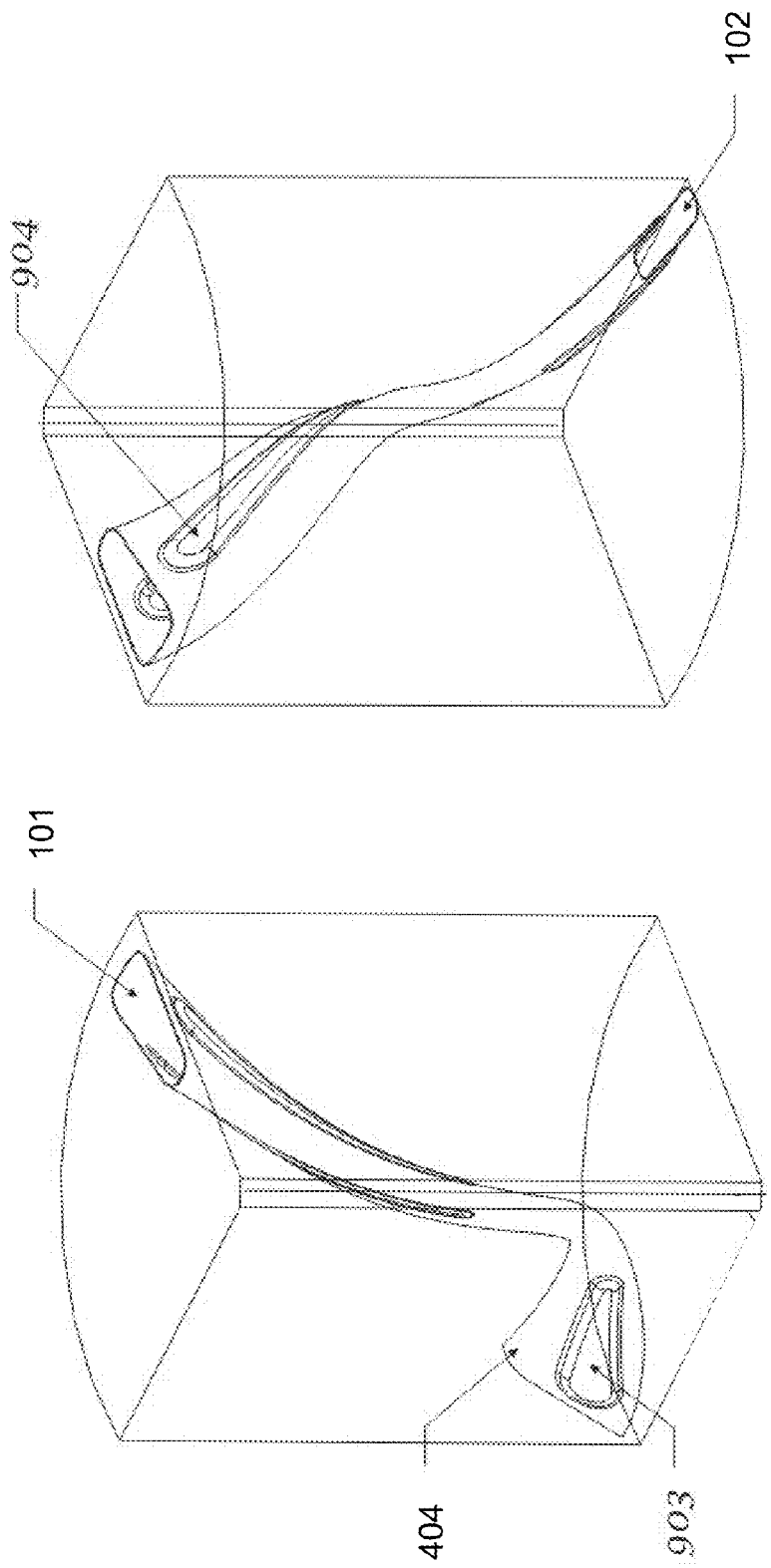

FIG. 9 illustrates alternative designs or configurations to blades or flutes to achieve optimal heat exchange and vapor condensation in accordance with embodiments of the present invention. In one embodiment, blades 404 shown in FIG. 9 includes one or more features 903-904 to reinforce the structure of blades especially if the blade is made of thin and pliable material such as stainless steel or titanium or alloy are used. The feature is to aid and to retain the shape of blade profile. Structural reinforcements by features 903-904 may be necessary to maintain the configuration of blades which are under continuous fluctuation of pressure and temperature. Fine element analysis produces improved performance of mechanical stability when temperature and pressure changes occur. It should be noted that the shape of blades illustrated in FIG. 9 is different from the shape of blades illustrated in FIG. 8. Depending on the applications, one configuration can have better results (more efficient) than another configuration.

Figure 10:
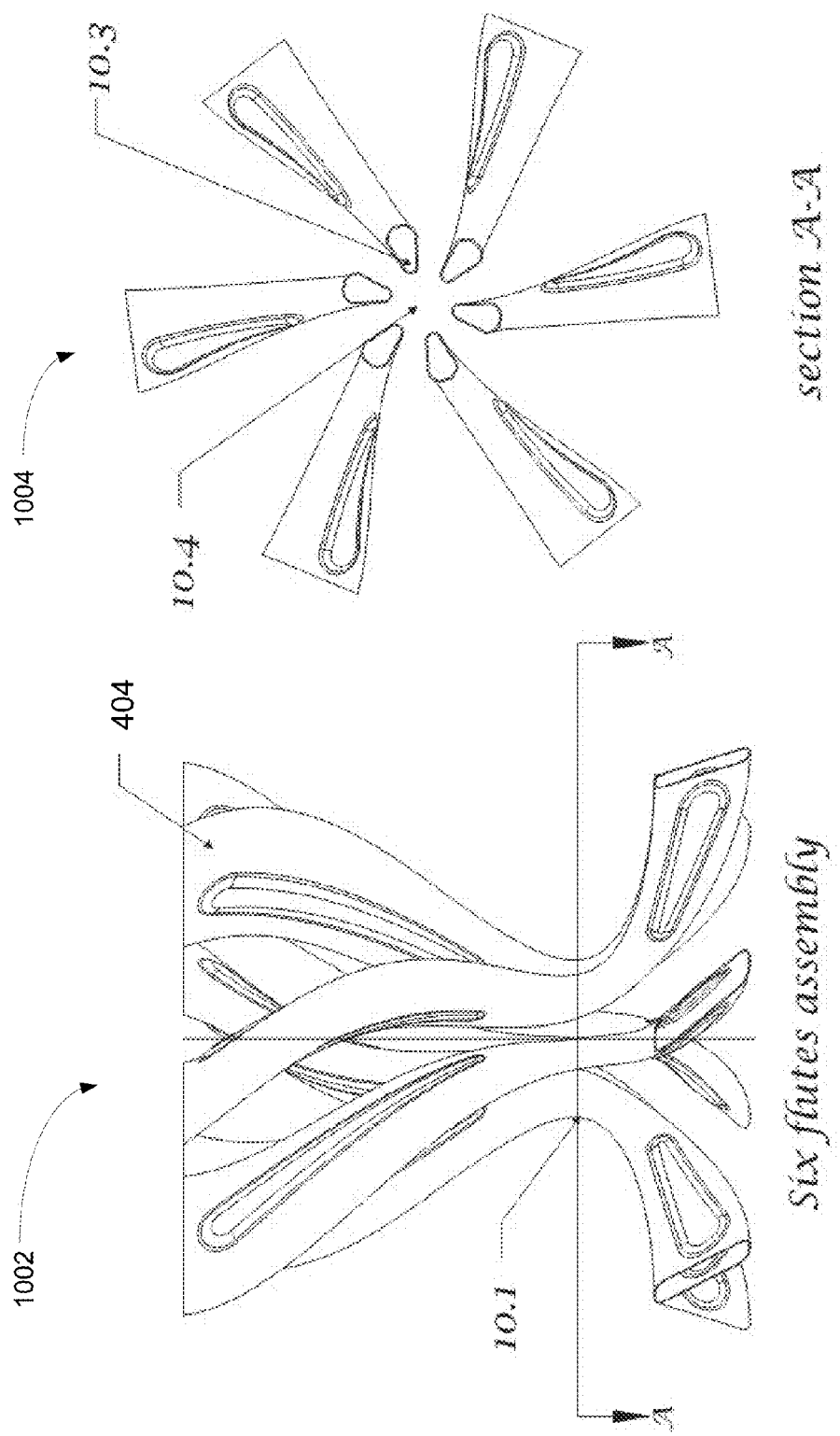
FIGS. 10-13 illustrate alternative configurations of vapor condensers including multiple flutes or blades assemblies in accordance with one embodiment of the present invention.

FIG. 10 illustrates an exemplary configuration of vapor condensers including six (6) flutes or blades in accordance with one embodiment of the present invention. FIG. 10 shows diagram 1002 containing six flutes assembly and diagram 1004 illustrating a cross-section view of diagram 1002 in accordance with section line A-A. It should be noted that areas pointed by numeral 10.1-10.4 are location(s) where phase transition occurs.

Figure 11:
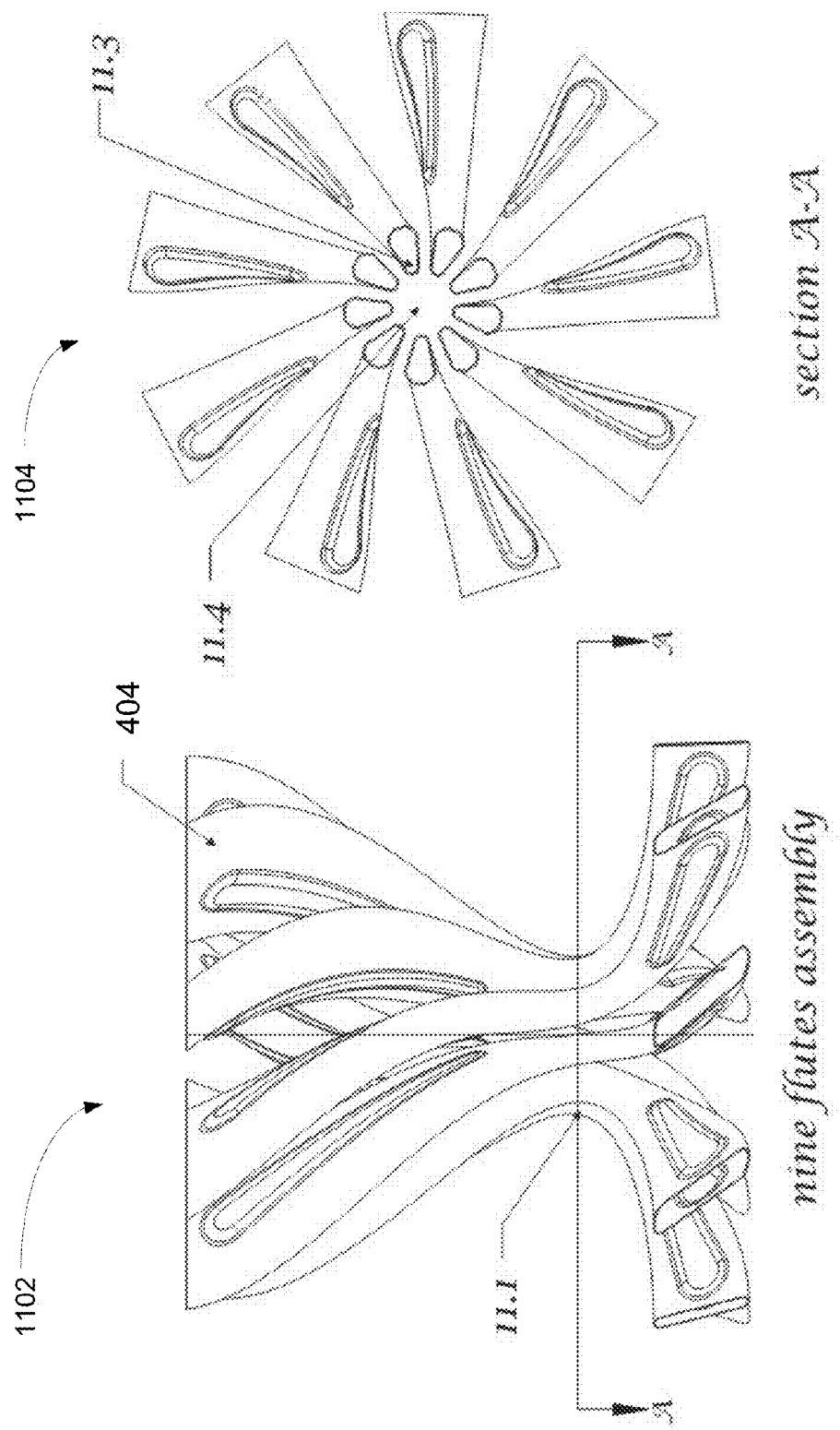

FIG. 11 illustrates an exemplary configuration of vapor condensers including nine (9) flutes assemblies in accordance with one embodiment of the present invention. FIG. 11 shows diagram 1102 containing nine flutes assembly and diagram 1104 illustrating a cross-section view of diagram 1102 in accordance with section line A-A. It should be noted that areas pointed by numeral 11.1-11.4 are locations where phase transition occurs.

Figure 12:
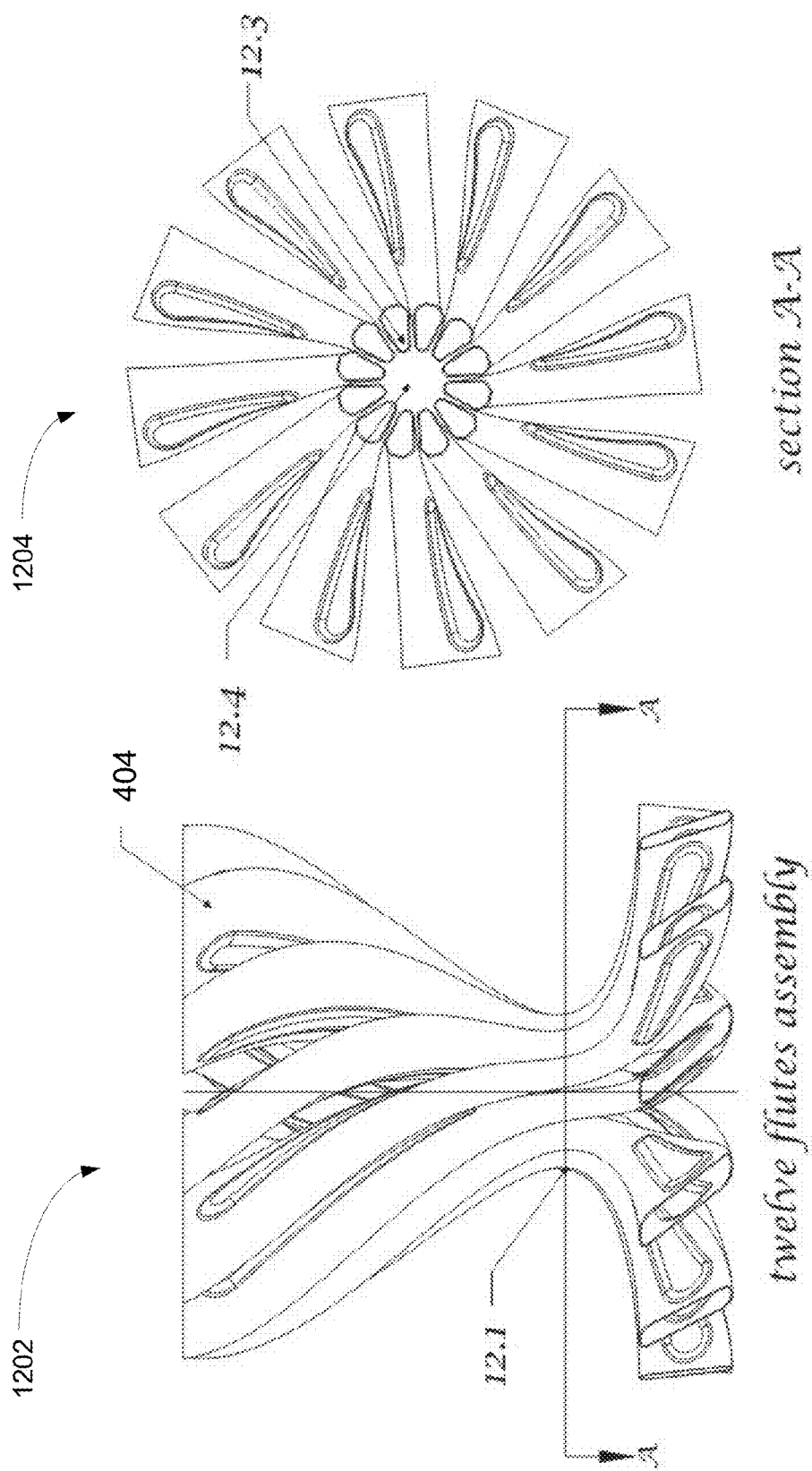
Figure 13:
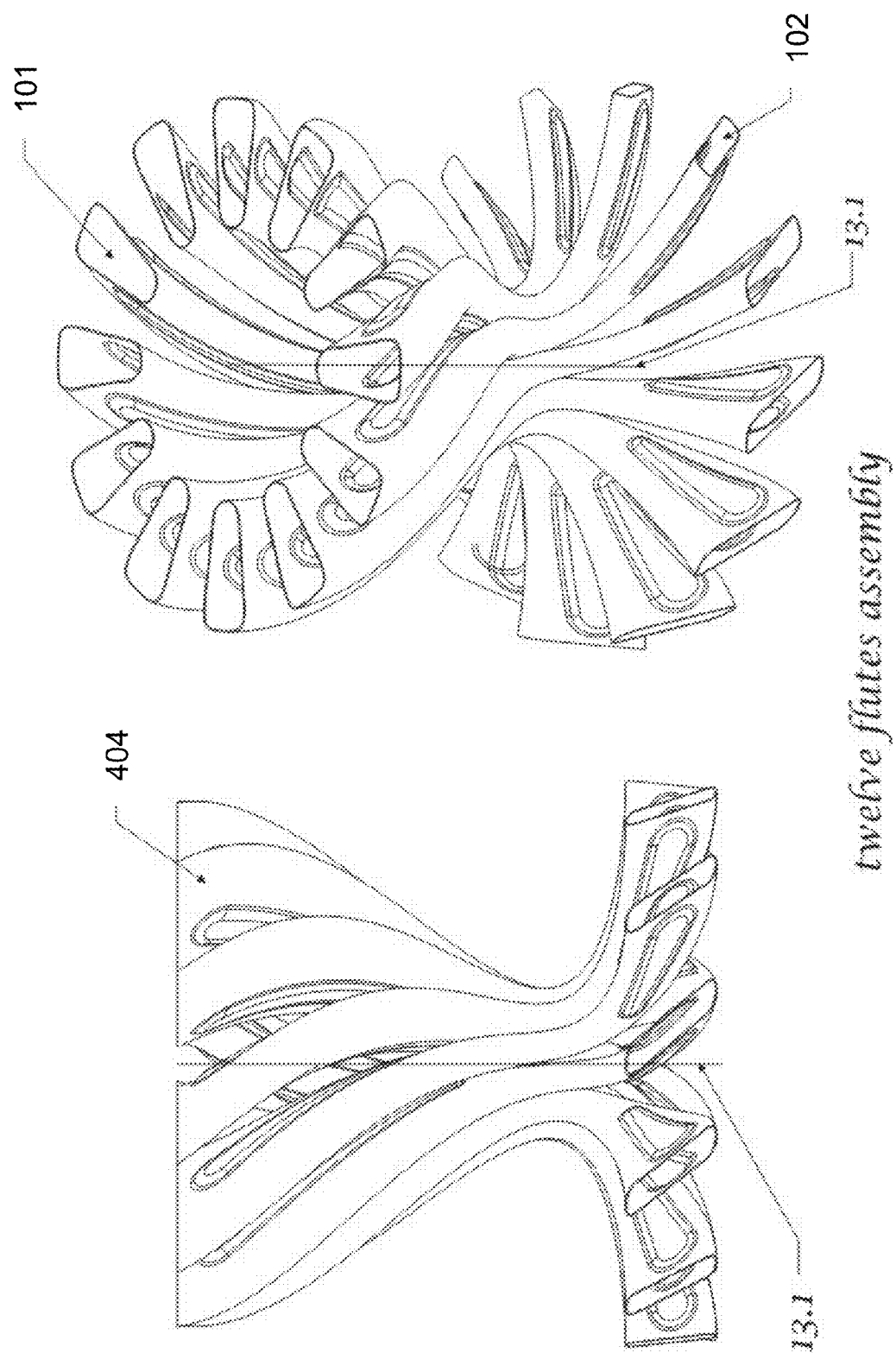

FIGS. 12-13 illustrate an exemplary configuration of vapor condensers including twelve (12) flutes assembly in accordance with one embodiment of the present invention. FIG. 12 shows diagram 1202 containing nine flutes assembly and diagram 1204 illustrating a cross-section view of diagram 1202 in accordance with section line A-A. It should be noted that areas pointed by numeral 12.1-12.4 are locations where phase transition occurs. FIG. 13 illustrates a 3D view of vapor condensers having twelve (12) flutes assembly. Note that numeral 13.1 points the middle section of the boiler.

Figure 14:
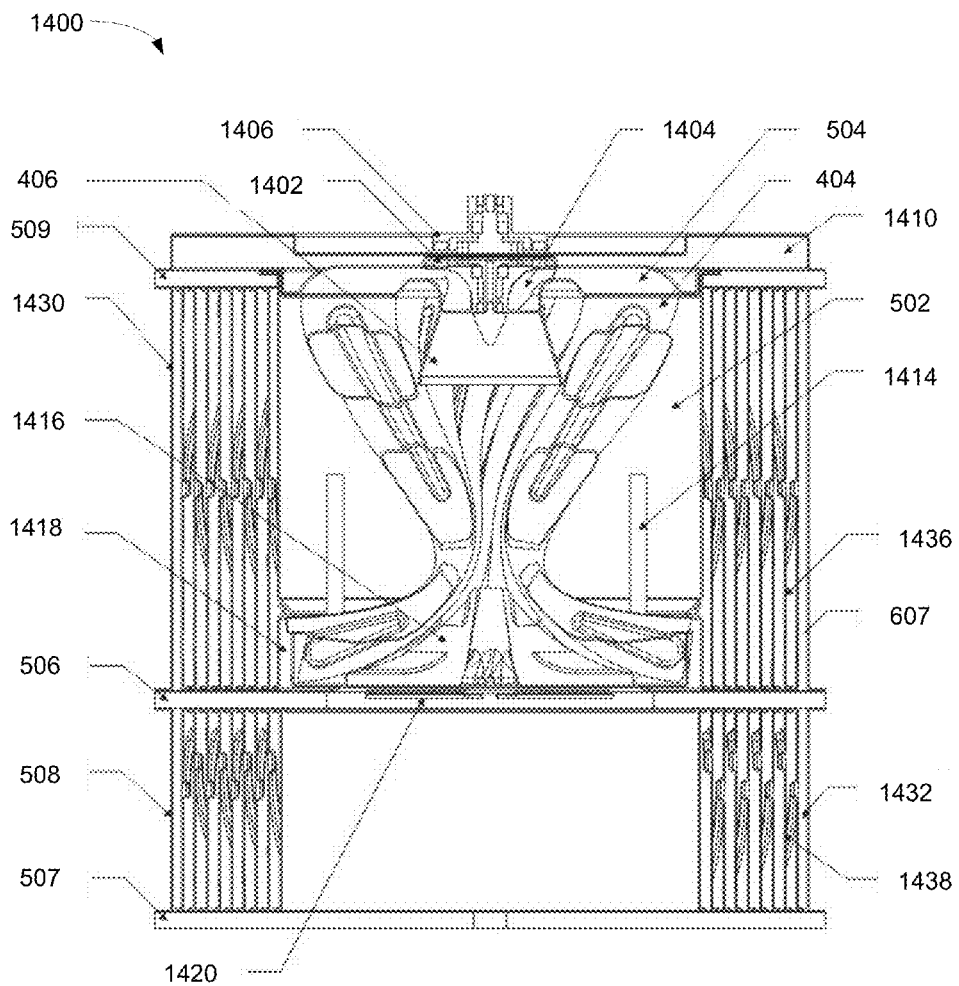
FIG. 14 is a diagram illustrating a cross section view of a main assembly capable of regenerating or reclaiming heat from processed liquid to achieve optimal energy efficiency in accordance with one embodiment of the present invention.

FIG. 14 is a diagram 1400 illustrating a cross-section view of a main assembly or HRP system capable of regenerating or reclaiming heat from processed liquid to achieve optimal energy efficiency in accordance with one embodiment of the present invention. Diagram 1400 includes a turbine 1402, main boiler 502, cover 1410, heat exchanger 1430, bottom heat exchanger 1432, directional heater 1416, and heat source 1420. Turbine 1402, in one aspect, further includes a motor 1406 and a turbine blade 1404. It should be noted that the underlying concept of the exemplary embodiment(s) of the present invention would not change if one or more components (or blocks) were added to or removed from diagram 1400.

In one embodiment, heat exchanger 1430 and bottom heat exchanger 1432 are interconnected wherein heat exchanger 1430 uses multiple pipes and/or tubes to extract heat from purified water when it passes through heat exchanger 1430. Bottom heat exchanger 1432 also employs various tubes to extract heat from waste water when it passes through bottom heat exchanger 1432. Heat exchanger 1430-1432 includes at least two independent sets of tubes or pipes 1436-1438 allowing incoming water which is cold to occupy one set of tubes while allowing processed water which is hot to occupy another set of tubes. Heat exchanger 1430-1432 further includes entrances 1418 capable of accepting processed water from the condenser to the heat exchanger.

Heat source 1420, which can be powered by electricity, solar, wind power, gasoline, or mechanical manual power generator, is coupled with heat guide 1416 to convert water molecules from liquid formation to vapor formation. A function of posts 1414 is to anchor various components. It should be noted that HRP system 1400 may include additional electronic components at bottom boiler 508.

Figure 15:
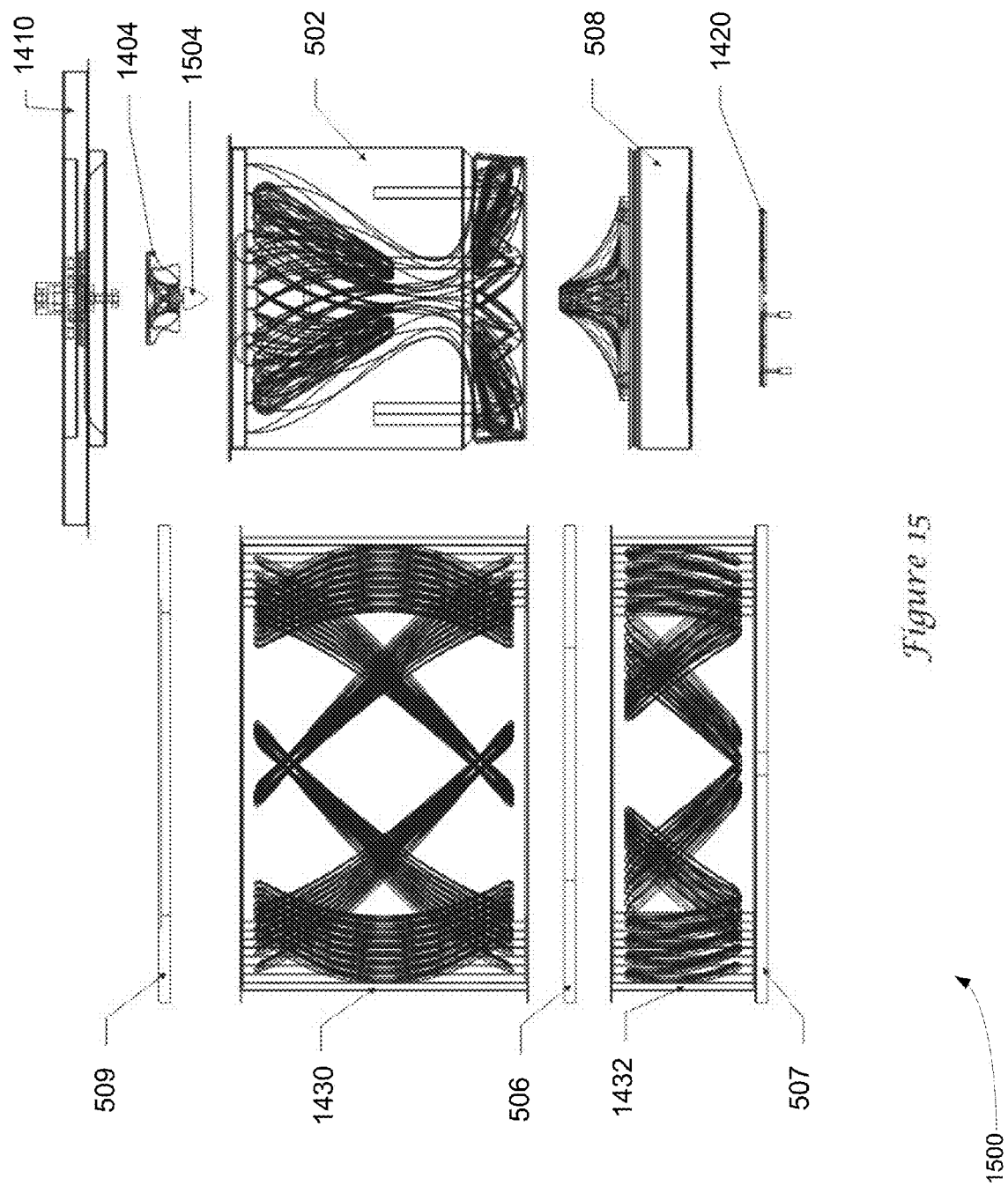
FIG. 15 illustrates an exemplary heat exchanger capable of reclaiming heat from processed liquid in accordance with one embodiment of the present invention.

FIG. 15 is a diagram 1500 illustrating an exemplary heat exchanger flow profile showing heat reclaiming process from processed liquid in accordance with one embodiment of the present invention. Diagram 1500 includes a turbine, a boiler 502, a top heat exchanger 1430, and a bottom heat exchanger 1432. The turbine includes a turbine blade 1404 and a nut 1504 wherein the turbine provides a vacuum above the incoming water to reduce the boiling point of the incoming water. The incoming water is preheated by the heat extracted from the processed water before it exits the HRP system. In one embodiment, the processed water or liquid is channeled by one or more pumps scattered across the heat exchanger(s) wherein the pumps, in one embodiment, are powered by pressurized incoming water. Note that the liquid is on outside of heat exchange tubes and the vapor and condensed liquid is on the inside of heat exchanger tubes. It should be noted that the underlying concept of the exemplary embodiment(s) of the present invention would not change if one or more components (or blocks) were added to or removed from diagram 1500.

Figure 16:
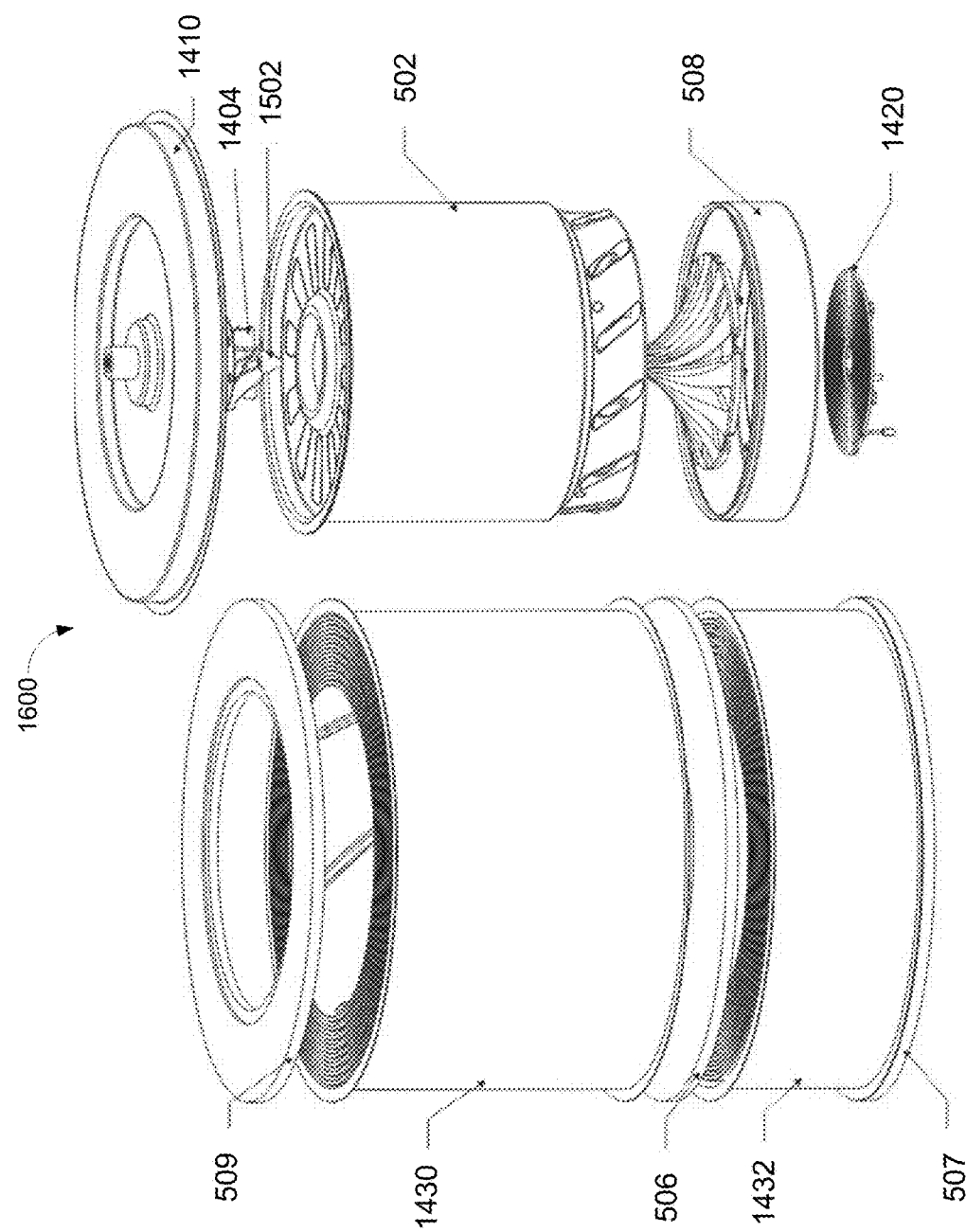
FIG. 16 is an exploded view of a main assembly configured to process liquid using heat regenerative mechanism in accordance with one embodiment of the present invention.

FIG. 16 is a diagram 1600 illustrating an exploded view of a main assembly or HRP system configured to process liquid using heat regenerative mechanism in accordance with one embodiment of the present invention. Diagram 1600 shows boiler 502, bottom boiler 508, heat exchanger 1430, and bottom exchanger 1432, wherein boiler 502 and bottom boiler 508 are structured such that they can fit inside of heat exchanger 1430-1432.

In one aspect, HRP system includes a boiler, turbine, condenser, heat exchanger, and feed pump(s). The system operates under the principles of the regenerative cycle. The condenser exchanges heat with water in the boiler, and the heat exchanger acts to preheat incoming water, while cooling outbound processed and waste water. In an operation, water enters the boiler where it is heated past the critical point, and steam is generated. The turbine draws a vacuum in the boiler and forces the steam through a manifold and through the condenser. Since the boiling points of impurities normally found in water are higher than the boiling point of water, the water vapor is assumed to be pure as it flows through the turbine. The mechanism of injecting water into the boiler, in one example, promotes rotational flow within the main body, shaping the flow as it approaches the turbine.

Additionally, the configuration of the blades in the condenser is such that heat transfer back into the bulk media is at a maximum by optimizing the level of wetted surface area. The shape of the blades and their configuration also serves to smooth flow of steam through the boiler and into the turbine. The flow of purified water through the condenser splits into 1 of 2 intake manifolds, each one serving a respective bank of condenser blades. The manifolds feed into identical counter flow heat exchangers, which use incoming feed water as the cold working fluid, and exiting purified and exiting waste water as the hot working fluid. The use of symmetry is meant to promote optimal efficiency by precisely managing the thermal gradient within the control volume. The shape of the blades is aimed to correspond with the proposed water fill line. This entire system is wrapped by a skin of stainless steel, and the heat exchangers will be placed on either side of the condenser banks.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 17:
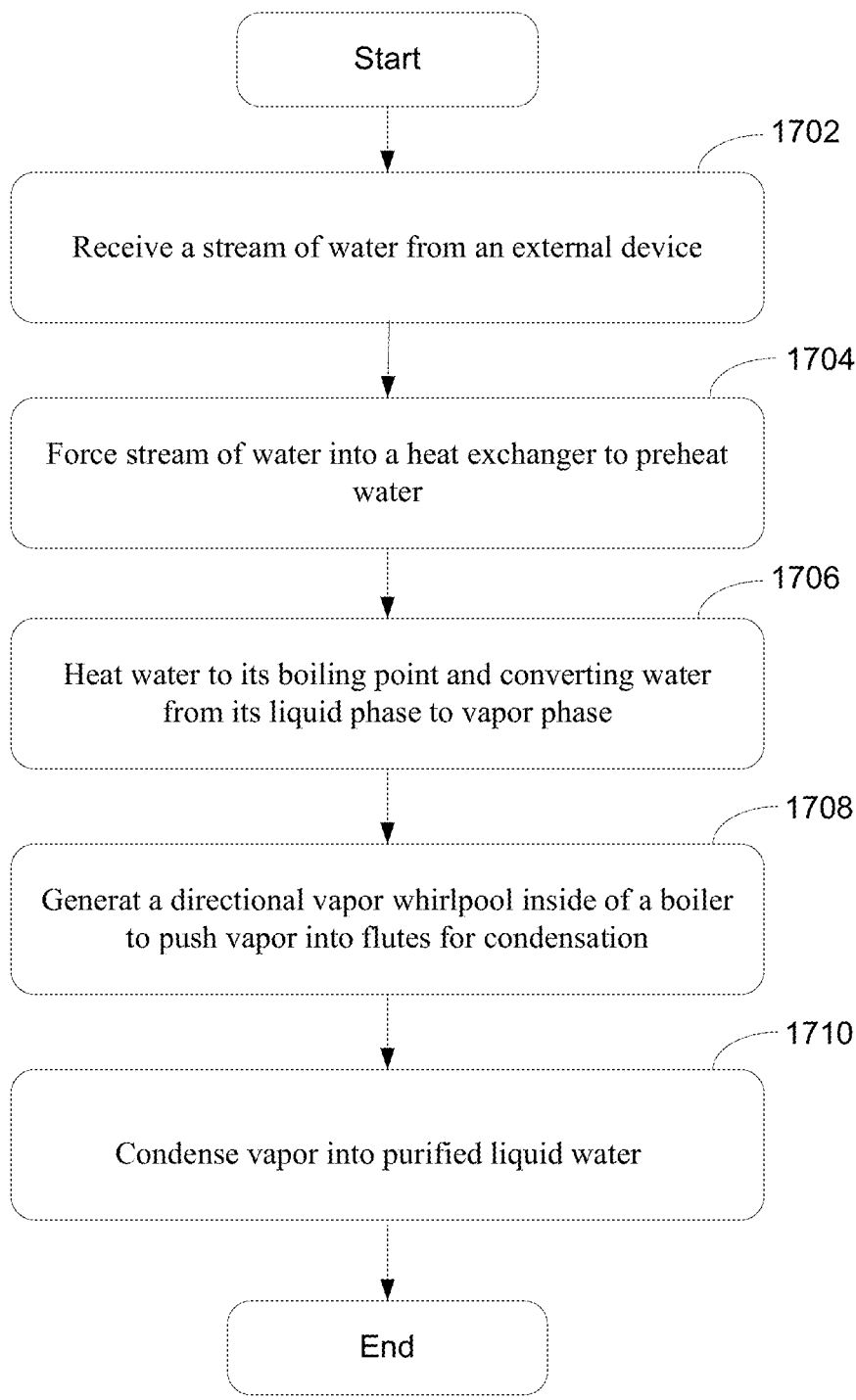
FIG. 17 is a flowchart illustrating a process of liquid purification using heat regenerative mechanism in accordance with one embodiment of the present invention.

FIG. 17 is a flowchart illustrating a process of liquid purification using heat regenerative mechanism in accordance with one embodiment of the present invention. At block 1702, a process capable of implementing regenerative heat exchange receives a stream of cold water from an external device, such as a municipal water supply company, river, well, pond, reservoir, or the like. Upon activating heat extracting pumps in response to water pressure provided by the stream of cold water, the process pushes or pumps purified water through the heat exchanger for transferring or extracting heat from purified water to the stream of cold water. The process also pushes or forces the discarded liquid such as waste water through the heat exchanger to extracting heat from the discarded liquid to preheat the stream of water.

At block 1704, when the stream of cold water enters the heat exchanger for preheating as the stream passes through the heat exchanger, water in the stream is heated to its boiling point when it reaches to the epic center. At block 1706, the stream of water is separated between purified water and waste water by converting a portion of water into vapor. At block 1708, a directional vapor whirlpool is generated inside of a boiler to push the vapor into a set of flutes for condensation.

At block 1710, the flutes or blades in the condenser condense vapor into purified water. The process forces the vapor through a set of angular shaped flutes capable of facilitating regenerating heat exchange between the angular shaped flutes. The purified water is subsequently pumped into the heat exchanger for heat extracting. The heat extracting or heat exchange occurs when hot pipes or tubes in the heat exchanger carrying hot purified water pass adjacent to cold pipes or tubes in the heat exchanger carrying the stream of cold water wherein the heat extracted from purified water preheats the incoming cold water. The hot waste water, on the other hand, is allowed to flow into the heat exchanger for heat extracting or heat reclaiming process. The heat reclaiming process occurs when hot pipes in the heat exchanger carrying the waste water pass adjacent to cold pipes in the heat exchanger carrying the stream of cold water. Upon activating heat extracting pumps in response to water pressure provided by the stream of water, the purified water is pushed through the heat exchanger for transferring heat from the purified water to the stream of water. The discarded liquid is also pumped through the heat exchanger for preheating the stream of water.

Heat Exchanger ("HE") in HRP System

A liquid processing system, also known as HRP system, discloses a liquid purification process using one or more HEs to reclaim or regenerate heat. The HRP system, containing one or more HEs which are also known as heat reclaiming devices, includes a first set of thermal conductive channels ("TCC"), a second set of TCC, and a third set of TCC. A manifold is used to conditionally separate the first HE from second HE. Note that the first HE can also be referred to as top HE and the second HE is referred to as bottom HE. In one example, the manifold, also known as center manifold, allows the third set of TCC to pass through the manifold while prevents the first and second sets of TCC from passing through the manifold.

The first set of TCC configured in the top HE is arranged in a cylindrical shape that is able to enclose or surround a main boiler. The first set of TCC is operable to guide a first liquid flow to flow through the top HE. Note that the first liquid flow can be hot purified water. The second set of TCC is configured in the bottom HE and it also has a cylindrical shape. The second set of TCC is able to guide a second liquid flow to flow through the bottom HE. Note that the second liquid flow can be waste water or liquid with impurities.

The third set of TCC, which is configured to thermally couple to the first set of TCC and the second set of TCC, is able to guide a third liquid flow through both the top HE and the bottom HE. The third liquid flow, in one example, is cold tap water, running water, river water, and the like. The third liquid flow, for example, flows through the third set of TCC and is able to extract or absorb heat from the first liquid flow and/or second liquid flow via the thermal connectivity between the first, second, and third sets of TCC.

Figure 18:
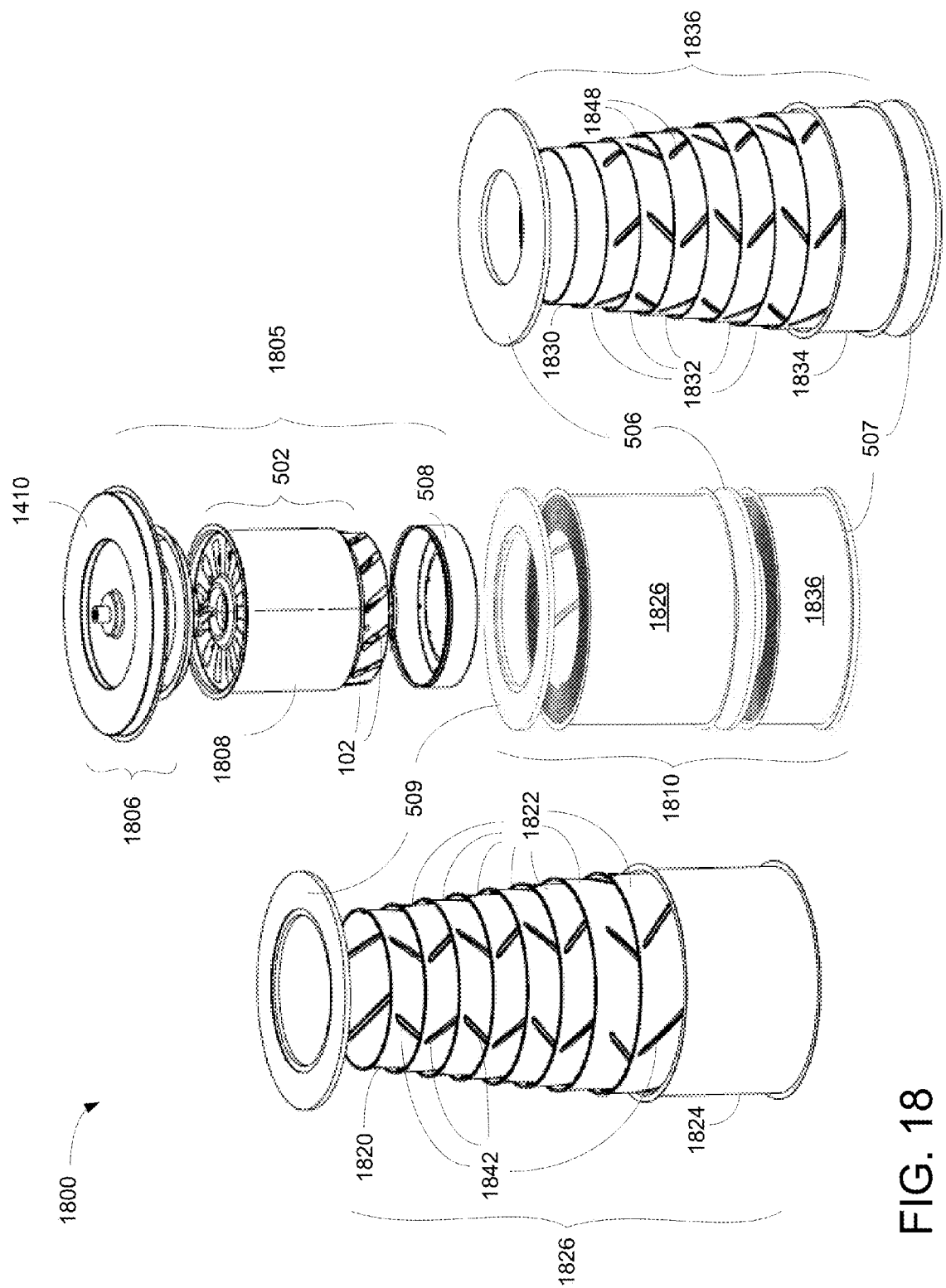
FIG. 18 illustrates a three-dimensional ("3D") view of a heat reclaim purification ("HRP") system using a heat exchanger ("HE") to reclaim heat during a purification process in accordance with one embodiment of the present invention.

FIG. 18 illustrates a three-dimensional ("3D") view of HRP system 1800 using an HE to reclaim heat during a purification process in accordance with one embodiment of the present invention. HRP system 1800 includes a boiler assembly 1805 and an HE 1810 wherein HE 1810 includes top HE 1826 and bottom HE 1836. Boiler assembly 1805 includes a turbine assembly 1806, a main boiler 502 and a liquid collecting panel 508. It should be noted that the underlying concept of the exemplary embodiment(s) of the present invention would not change if one or more components (or devices) were added to or removed from system 1800.

Top HE 1826, which is similar to HE 1430 shown in FIG. 14, includes multiple thermal conductive channels ("TCC") structured in multiple cylindrical shaped rings ("CSRs") 1820-1824. CSRs 1820-1824, in one embodiment, are formed with multiple nested concentric cylinders wherein CSR 1820 is the innermost cylinder while CSR 1824 is the outermost cylinder. Multiple cylinders 1822 are situated between CSR 1820 and CSR 1824 forming a multiple layered heat recovery or heat exchange device. CSR is made of thermal conductive materials, such as aluminum, metal, thermal conductive composite, and/or alloy, able to transmit heat between CSRs 1820-1824. Note that each CSR has a unique diameter whereby it can fit within neighboring CSRs to form an HE.

CSRs 1820-1824, in one embodiment, are configured to include hot TCC and cold TCC in an alternating arrangement. The alternating arrangement refers to hot TCC and cold TCC are structured in an alternate configuration whereby cold TCC can absorb heat from hot TCC. In one example, each cold TCC is situated adjacent to at least one hot TCC. In one aspect, most of cold TCC are switched by two hot TCC wherein the two hot TCC may facilitate passage of one or two hot liquid flows. Note that hot liquid flow can be purified water or waste water. Cold liquid flow can be tap water. Since HE 1826 is configured in the alternating arrangement, most of hot TCC are also switched by two cold TCC. For example, a flow of hot water travels ups and downs several times within the TCC to transfer its heat from hot water to cold water. Depending on the applications, the temperature of purified water at outlet port should be around room temperature since most of the heat carried by purified water is dissipated or transferred through TCC. The cold water or supply water, on the other hand, should be relatively warm or hot when the water reaches at boiler 1808 ready for processing. Warm supply water is generated partially because cold water absorbs heat from hot water via TCC or CSRs.

Bottom HE 1836, which is similar to HE 1432 shown in FIG. 14, includes multiple TCC structured in CSRs 1830-1834. CSRs 1830-1834, in one embodiment, are formed by multiple nested concentric cylinders wherein CSR 1830 is the innermost cylinder while CSR 1834 is the outermost cylinder. Multiple cylinders 1832 are situated between CSR 1820 and CSR 1824. CSR can be made of thermal conductive materials, such as aluminum, metal, thermal conductive composite, and/or alloy, for transmitting heat across CSRs 1830-1834. Note that each CSR has a unique diameter whereby it can fit between neighboring CSRs in HE 1836.

CSRs 1830-1834, in one embodiment, are configured to include hot TCC and cold TCC in an alternating arrangement. The alternating arrangement of CSRs refers to each cold TCC is adjacent to at least one hot TCC. In some cases, a cold TCC is switched by two hot TCC wherein the two hot TCC may facilitate passage of one hot liquid flow such as waste water. For example, a flow of hot water travels ups and downs several times within the TCC in bottom HE 1836 to transfer its heat from the flow of hot water to a flow of cold water such as tap water or river water. Depending on the applications, when waste water exits HRP system, its temperature should be closer to room temperature by dissipating its heat through the TCC while the cold water or supply water should be fairly warm when it reaches to boiler 1808 because it absorbs heat from hot waste and purified water via TCC.

During a purifying process, top HE 1826 reclaims or absorbs the heat from the processed liquid generated by boiler assembly 1805, while bottom HE 1836 reclaims the heat from waste liquid such as waste water generated b boiler assembly 1805 before it exits HRP system 1800. To reclaim or recover the heat, a cold liquid flow such as tap water or river water is used to extract heat from the processed or waste liquid before they leave HRP system 1800. The cold liquid flow, however, absorbs the heat from both top HE 1826 and bottom HE 1836 by traveling through HEs 1826 and 1836 before it reaches to boiler 1808.

An advantage of using an HE is that it is able to reclaim the heat from processed liquid and waste liquid by transferring the heat to the cold unprocessed liquid.

HRP system 1800, which can also be referred to as a liquid processing system, is capable of recovering heat via a heat reclaiming device. System 1800 includes a top set of hot TCC, a bottom set of hot TCC, and a cold set of TCC. The top set of hot TCC, configured to be in top HE 1826 having a cylindrical shape, is configured to surround a main boiler or boiler 1808. The top set of hot TCC is operable to guide a hot processed liquid flow such as purified water stream to flow through top HE 1826.

The bottom set of TCC, configured to be in bottom HE 1836 having a cylindrical shape, is operable to guide a waste liquid flow such as waste water stream to flow through bottom HE 1836. A manifold or central manifold 506 is situated between top HE 1826 and bottom HE 1836. In one aspect, central manifold 506 is used to separate between the purified liquid flow and waste liquid flow while allowing cold liquid flow to pass through.

The cold set of TCC is thermally coupled to the top set of TCC and bottom set of TCC for guide a cold liquid flow to flow through both top HE 1826 and bottom HE 1836. For example, the cold liquid flow flows through the cold set of TCC adjacent to the top set of TCC and extracts heat from the hot processed liquid flow via the top set of TCC and the cold set of TCC. Center manifold 506 allows the cold liquid flow to travel from one side of center manifold 506 to another side allowing the cold liquid flow to absorb heat from hot waste liquid flow as well as hot purified liquid flow.

The top set of TCC, in one embodiment, includes multiple top concentric cylinders or CSRs 1820-1824 which are configured to form top HE 1826. Top HE 1826, in one example, accumulates heat from processed or heated liquid generated by main boiler 1808. Each of top concentric cylinders has a unique diameter so that every top concentric cylinder can fit in one or two neighboring cylinders. Note that top HE uses various concentric cylinders or CSRs 1820-1824 to form a hollow column. While CSR 1820 adjacent to boiler 1808 has the smallest CSR diameter, CSR 1824 situated at the outmost of top HE 1826 has the largest diameter.

In one embodiment, top HE 1826 includes a hot conduit and a cold conduit wherein the conduits include guide ridges 1842 for guiding liquid flows. In an alternative embodiment, top HE 1826 includes multiple sets of hot conduits and cold conduits. The hot conduit, in one example, includes the top set of TCC and the cold conduit includes a portion of the cold set of TCC. The cold liquid flow, for example, can travel through the cold conduit absorbing heat transmitted from a hot liquid flow via the hot conduit. It should be noted that the cold liquid flow can be room temperature or ambient temperature of water stream, while the hot liquid flow such as purified water stream can be close to liquid boiling temperature.

Bottom HE 1836 includes CSRs 1830-1834 containing bottom set of TCC. Each of bottom CSRs 1830-1834 has a unique diameter allowing a larger bottom concentric cylinder to house or enclose a smaller bottom CSR whereby all CSRs 1830-1834 collapse into a single column configuration. Bottom HE 1836 includes at least one hot conduit and one cold conduit wherein the conduits, in one example, include guide ridges 1848 for guiding the flow(s). The cold conduit, in one example, includes a portion of cold set of TCC able to facilitate heat transfer between the hot conduit and the cold conduit. Note that bottom HE 1836 may include multiple sets of hot and cold TCC. It should be noted that top HE 1826 and bottom HE 1836 include guiding mechanism configured to direct and/or pump liquid flows in predefined directions.

An advantage of employing HE 1810 in HRP system 300 is that HE 1810 guides processed or purified hot liquid flow(s) to travel through thermally conductive pipes multiple times to recover heat from the hot liquid flows. The recovered heat is stored in the incoming cold liquid flow.

Figure 19:
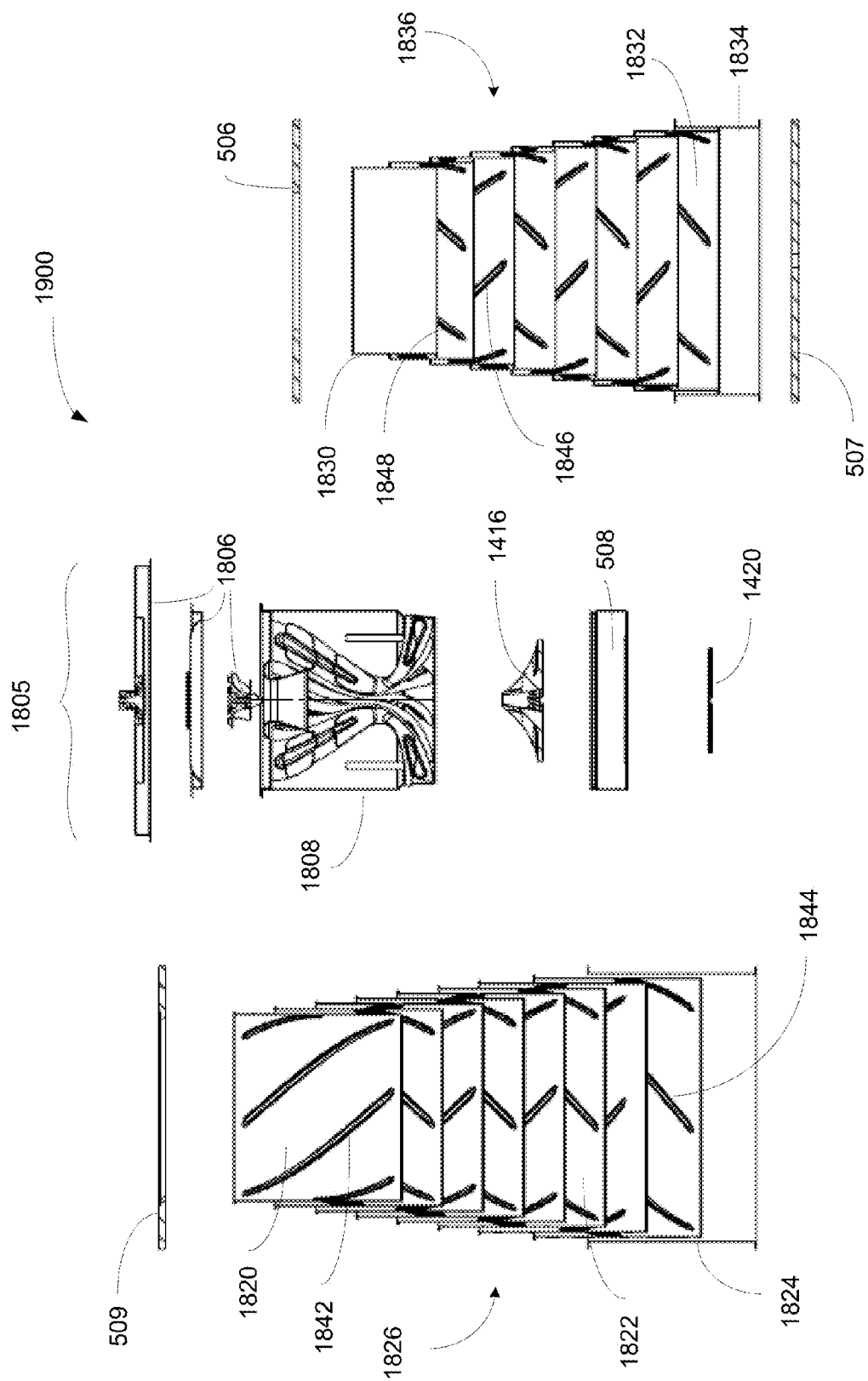
FIG. 19 is a diagram illustrating a cross-section view of a HRP system having an HE to reclaim heat in accordance with one embodiment of the present invention.

FIG. 19 is a diagram illustrating a cross-section view of HRP system 1900 having an HE for reclaiming heat in accordance with one embodiment of the present invention. HRP system 1900, which is similar to system 1800 shown in FIG. 18, includes a boiler assembly 1805, top HE 1826, and bottom HE 1836. Boiler assembly 1805 includes a turbine assembly 1806, main boiler 1808, heating source 1416, heating coil 1420, and liquid collecting panel 508. It should be noted that the underlying concept of the exemplary embodiment(s) of the present invention would not change if one or more components (or devices) were added to or removed from system 1900.

HRP system 1900, able to recover heat, includes an HE or top HE 1826, and a bottom HE 1836. Top HE 1826 includes CSRs 1820-1824 as a group of cylinders arranged in concentric nested layers forming a top set of TCC and a cold set of TCC. The hot set of TCC and the cold set of TCC are arranged in alternative sequence between the nested layers for thermal conductivity. The hot set of TCC is able to carry a processed hot liquid flow and the cold set of TCC is able to carry or transport a cold liquid flow whereby the cold liquid flow is allowed to absorb heat from the processed hot liquid flow. It should be noted that the terms "processed hot liquid" "purified hot liquid" "processed liquid" "purified liquid" "distill water" and "purified water" are referred to the same or similar liquid substance.

Bottom HE 1836 includes a second group of cylinders or CSRs 1830-1836 arranged in concentric nested layers forming a set of bottom hot TCC and a set of bottom cold TCC. The set of bottom hot TCC and set of bottom cold TCC are arranged in alternative sequence between nested layers for thermal conductivity. The set of bottom hot TCC is able to carry a hot waste liquid flow such as waste water. The set of bottom cold TCC transports cold liquid flow wherein the cold liquid flow absorbs heat from the hot waste liquid flow before the waste liquid leaves HRP system 1900.

HRP system 1900 further includes a boiler or main boiler 1808 which is situated in center of top HE 1826 for liquid purification. The cold liquid flow, in one aspect, travels through top HE 1826 and bottom HE 1836 to absorb heat from hot purified liquid and hot waste liquid whereby the heat is effectively stored in the cold liquid flow which is later to be processed. Boiler assembly 1805 further includes a turbine 1806 and heat source 1416 configured to generate purified water as well as liquid waste.

Top HE 1826 also includes a guiding mechanism such as pumping apparatus capable of directing liquid flows in predefined directions. Note that top set of hot TCC and cold set of TCC are arranged next to each other for heat exchange via thermal conductivities of TCC. The bottom set of TCC and bottom cold set of TCC are also arranged next to each other for heat exchange via thermal conductivities of TCC. Top HE 1826 and bottom HE 1836 further include guide ridges 1842-1848 used for guiding flow directions. For example, a purified water flow may travel in a direction according to flow guide ridges or guide ridges 1842-1844. Similarly, a waste water flow may flow in a direction according to flow guide ridges 1846-1848 in bottom HE 1836. Note that guide ridges 1842-1848 may be fabricated or structured as part of TCC or CSRs.

Main boiler 1808 is placed in the middle of top HE 1826. The outer surface of main boiler 502 includes multiple inlets which couple to top HE 1826. HE 1826 is able to receive incoming liquid or unprocessed cold liquid. Similarly, main boiler 1808 includes outlets which allow purified liquid to leave boiler 1808 and enter top HE 1826. Main boiler 1808 also includes various outlets to discharge waste liquid via bottom HE 1836. Bottom HE 1836 transfers heat in waste water to cold water via CSRs before it leaves HRP system.

Top HE 1826, in one embodiment, is a multiple-layered structure including multiple concentric cylinders in a nested formation. The concentric cylinders are arranged in such a way that a gap, channel, or space is provided between every two consecutive cylinders. The gaps between the concentric cylinders form TCCs or flow channels for liquid flow(s) traveling through for HE. Top HE 1826 includes an upper manifold 509, which contains a seal to close the top opening of nested cylinders. Upper manifold 509 further provides connecters wherein each connector, for example, connects two concentric cylinders to form a longer TCC or flow channels. The surfaces of concentric cylinders are structured with flow guide ridges 1842-1844.

In operation, flow guide ridges 1842-1844 direct liquid flow(s) running through the gaps to predefined directions. The predefined directions include defined flow patterns which, for example, can be a helical flow formation. In one example, heights of flow guide ridges 1842-1844 from surface of concentric cylinders are similar or the same between adjacent cylinders.

Figure 20:
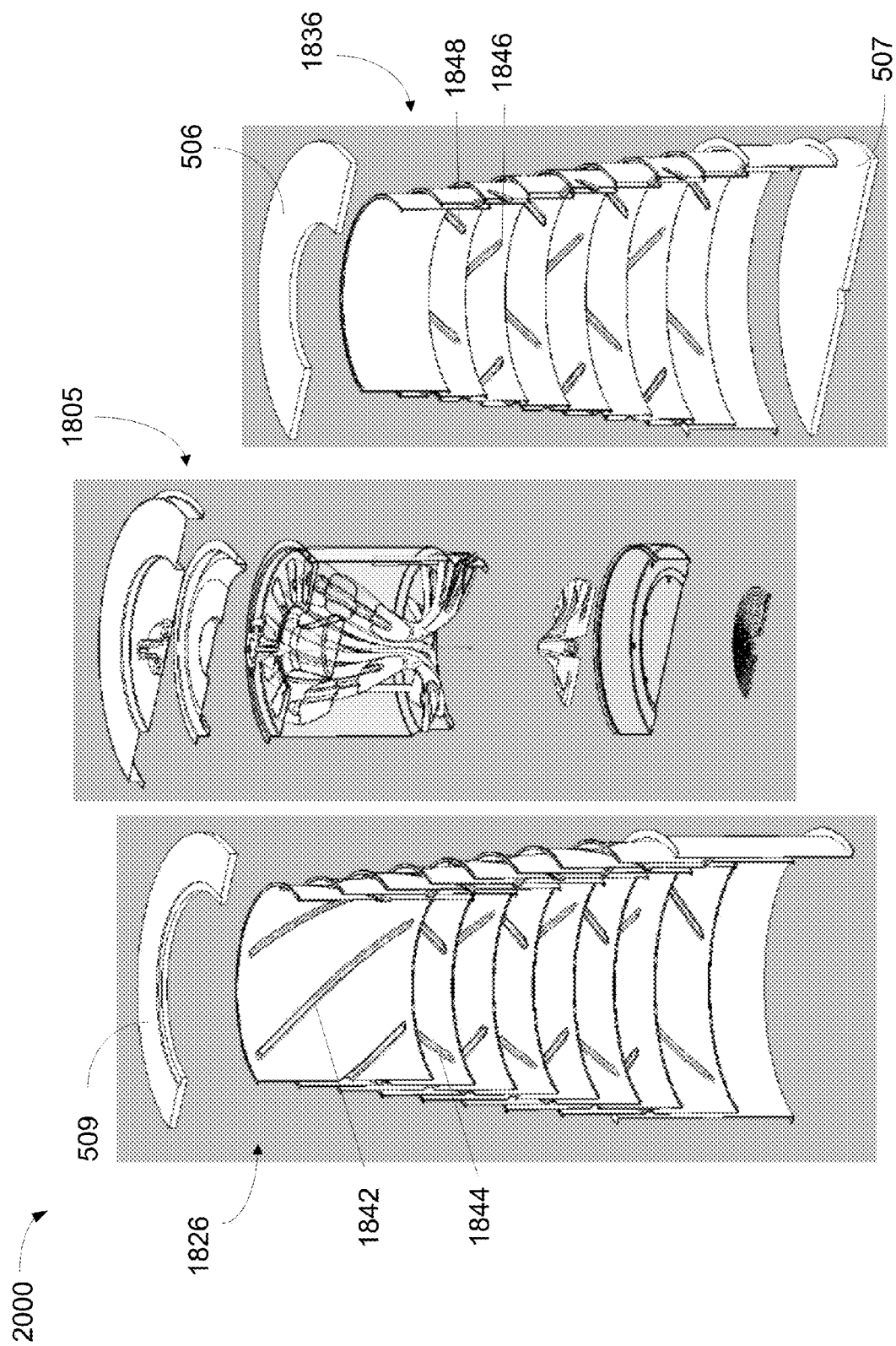
FIG. 20 is a diagram illustrating a 3D cut-away view of a HRP system having an HE and a boiler assembly in accordance with one embodiment of the present invention.

FIG. 20 is a diagram illustrating a 3D cut-away view of a HRP system 2000 having an HE and a boiler assembly in accordance with one embodiment of the present invention. HRP system 2000, which is similar to system 1800 shown in FIG. 18, includes a boiler assembly 1805, top HE 1826, and bottom HE 1836. Boiler assembly 1805 includes a turbine assembly, main boiler, heating source, heating coil, and liquid collecting panel. It should be noted that the underlying concept of the exemplary embodiment(s) of the present invention would not change if one or more components (or devices) were added to or removed from system 2000.

HRP system 2000 illustrates a set of CSRs decreasing in size and/or diameter whereby a CSR can be placed inside of another. While the heights of CSRs can be similar or the same, diameters for each CSR is unique. In one example, each CSR include multiple flow guide ridges 1842-1848 used for guiding liquid flow in both ups and downs. Flow guide ridges such as ridges 1842-1848, in one aspect, are physically protruded to form ridges on the surface of CSRs. In one example, flow guide ridge is oriented in a slanted angle relative to top manifold 509 or center manifold 506. When liquid flows within TCC between CSRs, flow guide ridge 1842-1848 can guide the flow(s) in orientations conforming to angle of flow guide ridge 1842-1848.

In one aspect, top HE 1826 or bottom HE 1836 includes multiple CSRs configured in a nested configuration capable of performing heat transfer. The terms "CSRs" and concentric cylinders can be used interchangeably. Also, the terms "TCC" and flow channel can also be used interchangeably. Each CSR includes one or more flow guide ridges such as ridges 1842-1848 for guiding liquid flows. Depending on the applications, the flow guide ridges may form TCC for heat transfer based on physical properties of thermal conductive material of TCC.

Figure 21A:
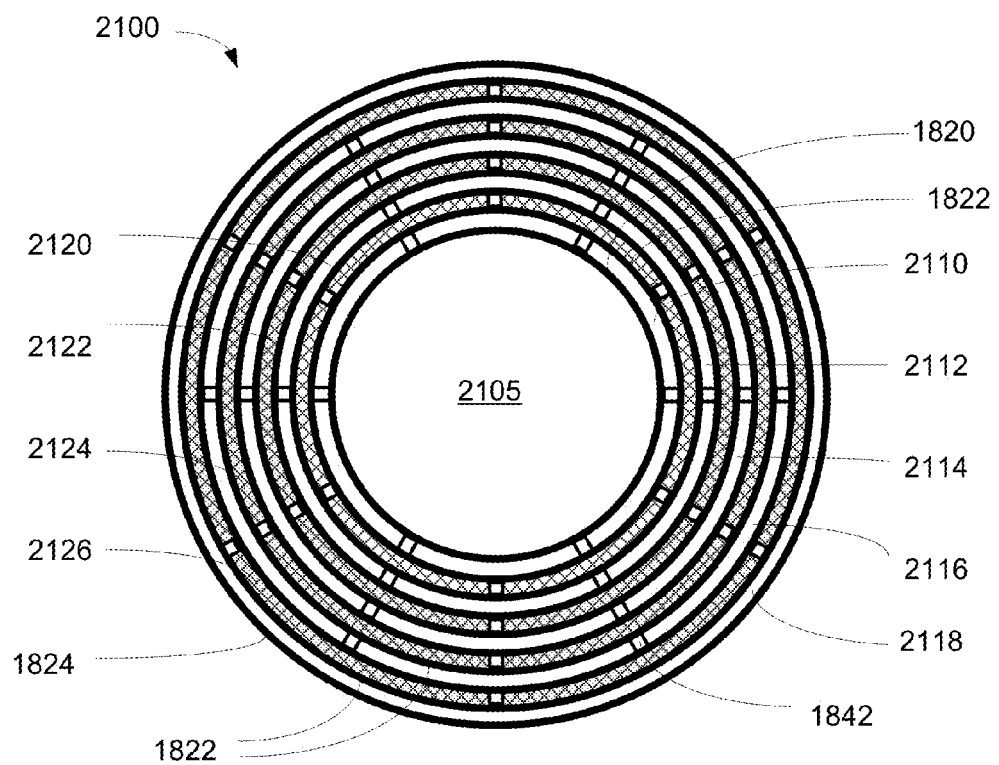
FIGS. 21A-B are diagrams illustrating cross-section views of top HE and bottom HE showing flow channels in accordance with one embodiment of the present invention.
Figure 21B:
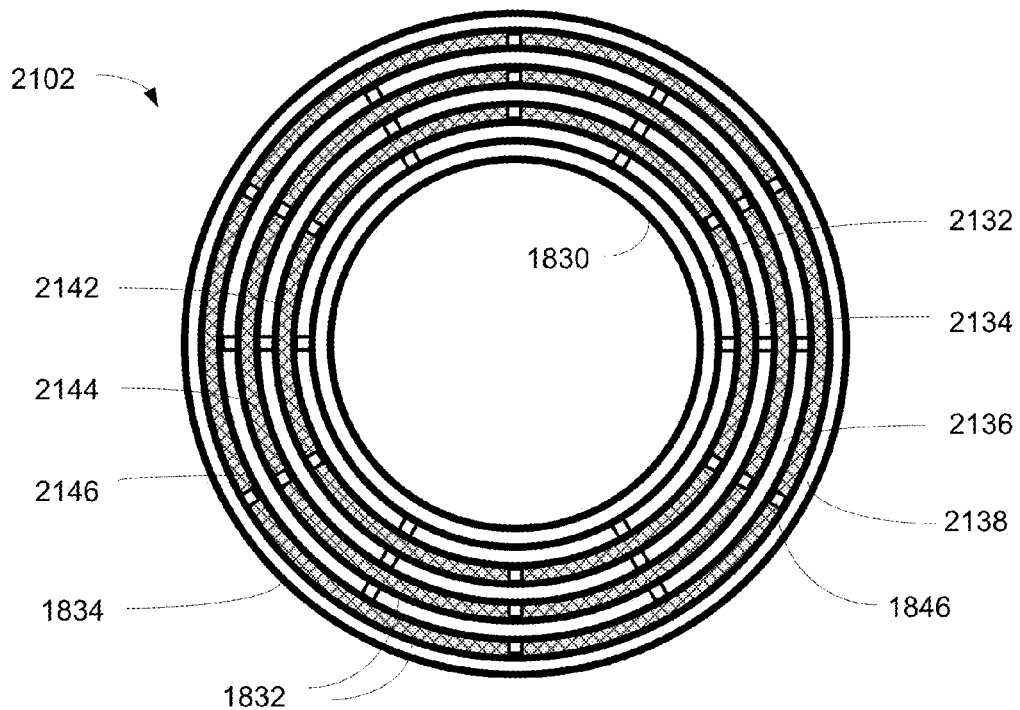

FIGS. 21A-B are diagrams 2100-2102 illustrating cross-section views of top HE and bottom HE showing TCC or flow channels in accordance with one embodiment of the present invention. Diagram 2100 illustrates a cross-section view of top HE 1826 containing multiple CSRs 1820-1824 having a hollow column configuration. The hollow 2105 can be used to house a main boiler. Each CSR is arranged to have a gap or space between its neighboring CSR(s). The space between CSRs, in one embodiment, is arranged to form hot TCC such as flow channels 2120-2126 and cold TCC such as flow channels 2110-2118. In an alternative embodiment, flow guide ridges are used to further divide TCC into multiple flow channels. It should be noted that the underlying concept of the exemplary embodiment(s) of the present invention would not change if one or more components (or CSRs) were added to or removed from diagram 2100.

During an exemplary operation, after a purified water flow leaves a boiler, the purified water flow enters flow channel 2120 through inlet on CSR 1820. The purified water flow travels through channels 2122-2126 while transferring its heat to a cold (unprocessed) water flow flowing through flow channels 2110-2118. When the purified water flow is about to leave the top HE, the majority of its heat should have been passed onto the incoming cold water flow.

Diagram 2102 illustrates a cross-section view of bottom HE 1836 containing multiple CSRs 1830-1834 wherein each CSR is arranged to have a gap or space between its neighboring CSR(s). The space between CSRs, in one embodiment, is arranged to form hot TCC such as flow channels 2142-2146 and cold TCC such as flow channels 2132-2136. During an exemplary operation, after a purified water flow leaves a boiler, the purified water flow, in one example, enters flow channel 2120 through inlet on CSR 1820.

During an exemplary operation, after a waste water flow leaves a boiler, the waste water flow enters flow channel 2142 through inlet on CSR 1830. The waste water flow travels through channels 2144-2146 while transferring its heat to a cold (unprocessed) water flow flowing through flow channels 2132-2138. When the waste water flow is about to leave the bottom HE, the majority of its heat should have been passed onto the incoming cold water flow.

Flow channels 2110-2126, in one example, are separated into a hot group and a cold group, wherein the groups are arranged in alternating sequences. For example, hot flow channel 2122 is placed next to cold flow channel 2116 and cold flow channel 2116 is further placed next to hot flow channel 2124. Processed liquid exiting from the boiler has a higher temperature than the incoming or unprocessed liquid. The alternating sequence arrangement of flow channels provides heat exchange between the hot processed liquid and the cool incoming liquid in the hot and cold groups of flow channels.

FIGS. 22A-C are diagrams 2201-2203 illustrating TCC or flow channels in an HE for heat recovery in accordance with one embodiment of the present invention. Diagram 2201 illustrates an exemplary cross-section side-view of top HE 1826 coupled with upper manifold 509 and center manifold 506. In one embodiment, upper manifold 509 contains connectors 2250-2252 which provide hermetical connections between one or more flow channels such as channels 2110-2126 for flow channel extension. Center manifold 506 also includes a set of hermetical connectors such as connector 2254 for top HE 1826 and another set of hermetical connectors such as connector 2256 for bottom HE 1836. In one aspect, center manifold 506 includes an inlet or inlet port 2212 for receiving processed liquid 2206 from the boiler, and an outlet or outlet port 2210 for discharging processed liquid 2208 such as purified water. It should be noted that inlet and/or outlet can be placed at other locations such as upper manifold 507 or top HE 1826.

In operation, when processed liquid flow 2206 travels through flow channels 2120-2126, a cold liquid flow or unprocessed liquid flow 2218 also travels through flow channels 2110-2118. The unprocessed liquid flow 2218 absorbs heat from processed liquid flow 2206. When processed liquid flow 2206 reaches at outlet 2210, it becomes a lukewarm or room temperature wherein majority of heat in flow 2206 has been transferred or stored at cold liquid flow 2218.

Diagram 2202 illustrates an exemplary cross-section side-view of bottom HE 1836 coupled with center manifold 506 and lower manifold 507. In one embodiment, center manifold 506 contains connectors such as connector 2256 which provide hermetical connections between various flow channels such as channels 2142-2146 for flow channel extension. Lower manifold 507 also includes a set of hermetical connectors such as connector 2260 for bottom HE 1836. In one aspect, center manifold 506 includes an inlet or inlet port 2258 for receiving waste liquid flow 2216 from the boiler. Lower manifold 507 includes an outlet or outlet port 2216 for discharging waste liquid 2216 such as waste water. It should be noted that inlet and/or outlet can be placed at other location(s) depending on the applications.

In operation, when waste liquid flow 2215 travels through flow channels 2142-2146, a cold liquid flow 2218 also travels through flow channels 2132-2138. The cold liquid flow 2218 absorbs heat from waste liquid flow 2215. When waste liquid flow 2215 reaches at outlet 2213, it becomes a lukewarm or room temperature wherein the majority of heat in flow 2215 has been transferred to cold liquid flow 2218.

Diagram 2203 illustrates an exemplary cross-section side-view of top HE 1826 and bottom HE 1836 wherein HEs 1826 and 1836 are coupled with upper manifold 509, center manifold 506, and lower manifold 507. In one embodiment, center manifold 506 contains connectors such as connectors 2220-2224 which allow cold flow channels to pass between top HE 1826 and bottom HE 1836. Upper manifold 509 provides hermetical connections such as connectors 2262-2264 to connect one or more flow channels such as channels 2110-2116 for flow channel extension. Lower manifold 507 also includes a set of hermetical connectors such as connector 2266 to extend flow channels. In one aspect, center manifold 506 includes an outlet or outlet port 2270 for supplying unprocessed or cold liquid flow 2219 to the boiler. Lower manifold 507 includes an inlet or inlet port 2268 for receiving unprocessed liquid or cold liquid 2218 such as tap water. It should be noted that inlet and/or outlet can be placed at other location(s) depending on the applications.

In operation, unprocessed liquid flow 2218 enters inlet 2268 and travels through flow channels 2110-2116 as indicated by arrows before it exits at outlet 2270 and subsequently enters the boiler. When unprocessed liquid flow 2218 travels through flow channels 2110-2116, processed liquid flow 2206 also travels through top HE 1826 and waste liquid flow 2215 travels through bottom HE 1836. When hot and cold liquid flows 2206, 2215, 2218 pass next to each other through their own flow channels, the heat in hot liquid flows 2206 and 2215 passes to cold liquid flow 2218 whereby the heat is removed from hot liquid flows and stored in the cold liquid flow. When unprocessed liquid flow 2218 reaches to outlet 2270, it becomes relatively warm since the majority of the heat in flows 2206 and 2215 has been transferred to cold liquid flow 2218.

Note that the locations of inlet and/or outlet ports are not limiting to the example illustrate herein. Heated waste liquid exiting from the boiler enters inlet port 2258 and then passing through flow channel 2142, connecter 2260, flow channel 2144, connecter 2256, and then flow channel 2146 before discharged via outlet port 2216. To reduce heat loss, upper manifold 509, center manifold 506, and lower manifold 507 include thermal insulation layer to prevent heat loss through manifolds 506-509. Incoming liquid flow, in one example, enters bottom HE 1836 via inlet port 2268 and passes though flow channel 2136 at bottom HE 1836, connectors 2220 at center manifold 506, flow channel 2116 at top HE 1826, connecter 2262 at upper manifold 509, flow channel 2114 at top HE 1826, connecter 2222 at center manifold 506, flow channel 2134 at bottom HE 1836, connecter 2266 at lower manifold 507, flow channel 2132 at bottom HE 1836, connecter 2224 at center manifold 506, flow channel 2112 at top HE 1826, connecter 2264 at upper manifold 509, and channel 2110 before exiting outlet 2270.

According to one embodiment of the present invention, the hot liquid flow flows from inner diameter towards outer diameter of HE while incoming cold liquid flow flows from outer diameter of HE toward inner diameter of HE.

Figure 23:
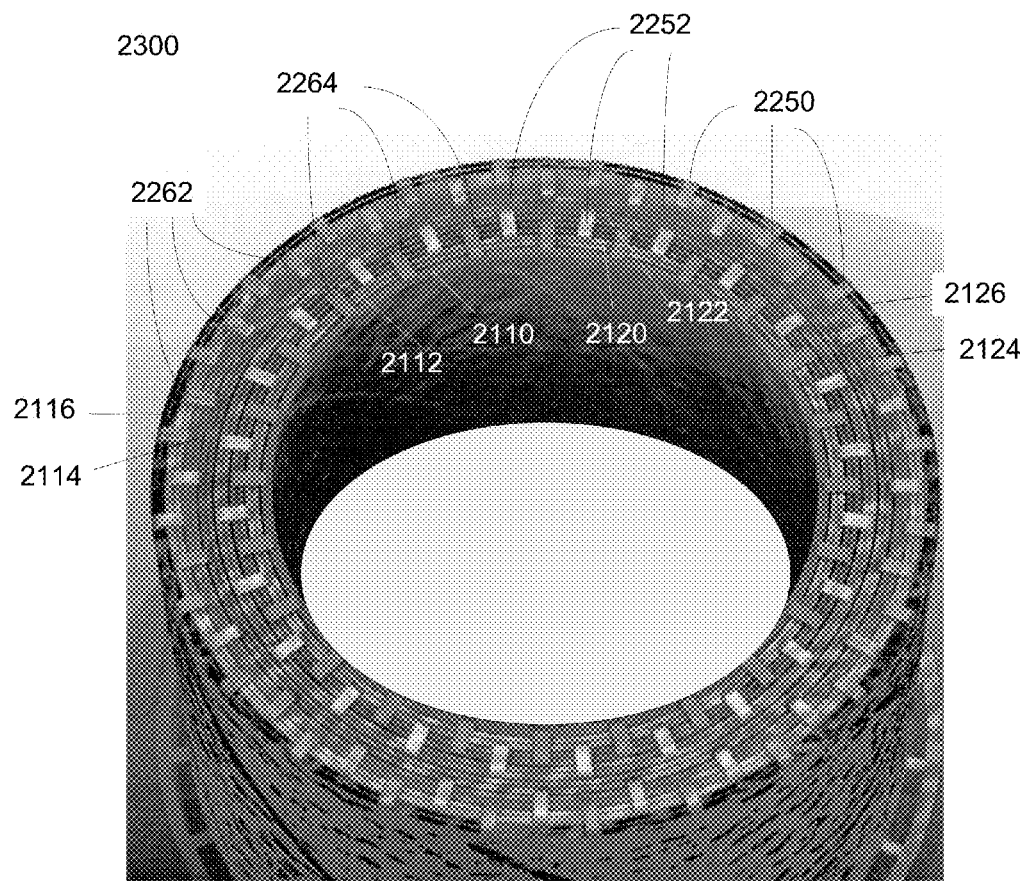
FIG. 23 is a 3D diagram illustrating a top view of an HE in accordance with one embodiment of the present invention.

FIG. 23 is a 3D diagram 2300 illustrating a top view of an HE in accordance with one embodiment of the present invention. Diagram 2300 illustrates a top HE having multiple CSRs forming various flow channels 2110-2126 wherein at least some of them are connected by connectors or hermetical connectors 2250-2252 and 2262-2264. For example, connectors 2262 connect flow channel 2114 and flow channel 2116, and connector 2264 connect flow channel 2112 and 2010. It should be noted that the underlying concept would not change if different connectors and configurations of connectors are used and/or removed from diagram 2300.

Figure 24:
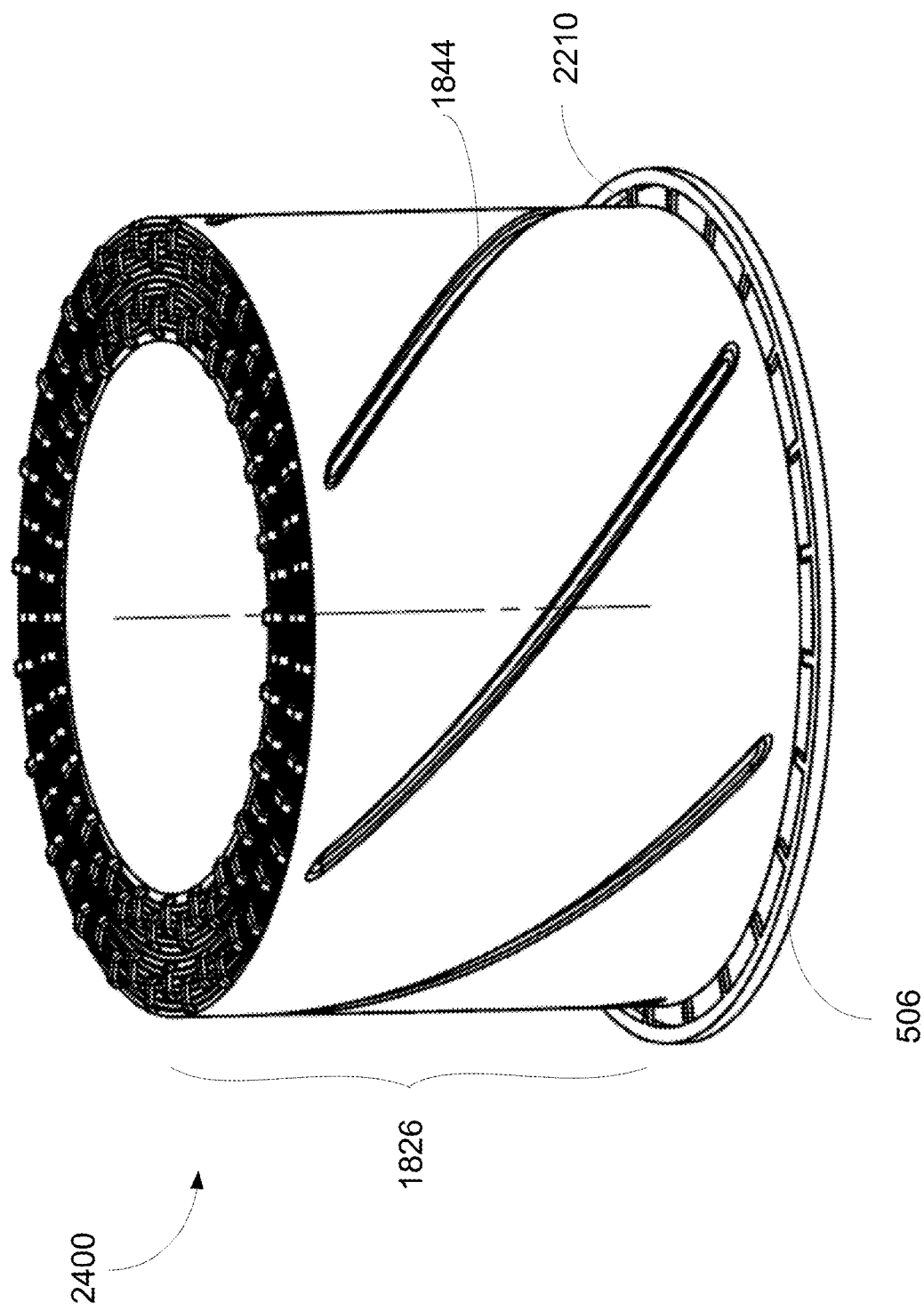
FIG. 24 is a 3D diagram showing a top HE having flow guide ridges in accordance with one embodiment of the present invention.

FIG. 24 is a 3D diagram 2400 showing a top HE having flow guide ridges in accordance with one embodiment of the present invention. Diagram 2400 illustrates multiple CSRs forming a top HE 1826 showing a flow guide ridges 1844 for guiding flow of liquid. Flow guide ridges 1844 is formed with a slanted angle relative to center manifold 506. Liquid flows between two neighboring flow guide ridges 1844, in one example, tend to flow parallel to the flow guide ridges 1844. Top HE 1826 is coupled to center manifold 506 wherein center manifold 506 contains multiple inlet ports 2210 for receiving processed liquid.

FIG. 25 shows diagrams 2502-2506 illustrating cross-section side-views of HE showing hot and cold TCC in accordance with one embodiment of the present invention. Diagram 2502 illustrates unprocessed liquid flow 2218 that travels through bottom HE 1836 and top HE 1826 via upper manifold 509, center manifold 506, and lower manifold 507 as indicated by arrows 2510-2512. Diagram 2504 shows processed liquid flow path in top HE 1826. Processed liquid flow 2206 produced by the boiler enters top HE 1826 via center manifold. After traveling through CSRs in top HE 1826 as indicated by arrows 2516, processed liquid flow exits at outlet 2210. Diagram 2506 illustrates waste liquid flow path in bottom HE 1836. Waste liquid flow 2215 enters bottom HE 1836 via inlet port at center manifold 506, flow 2215 flows through a sequence of flow channels in bottom HE 1836 before it exits via lower manifold 507. When waste liquid flow 2216 exits from bottom HE 1836, it should be relatively cool because most of its heat has been transferred to incoming unprocessed liquid flow.

Figure 26A:
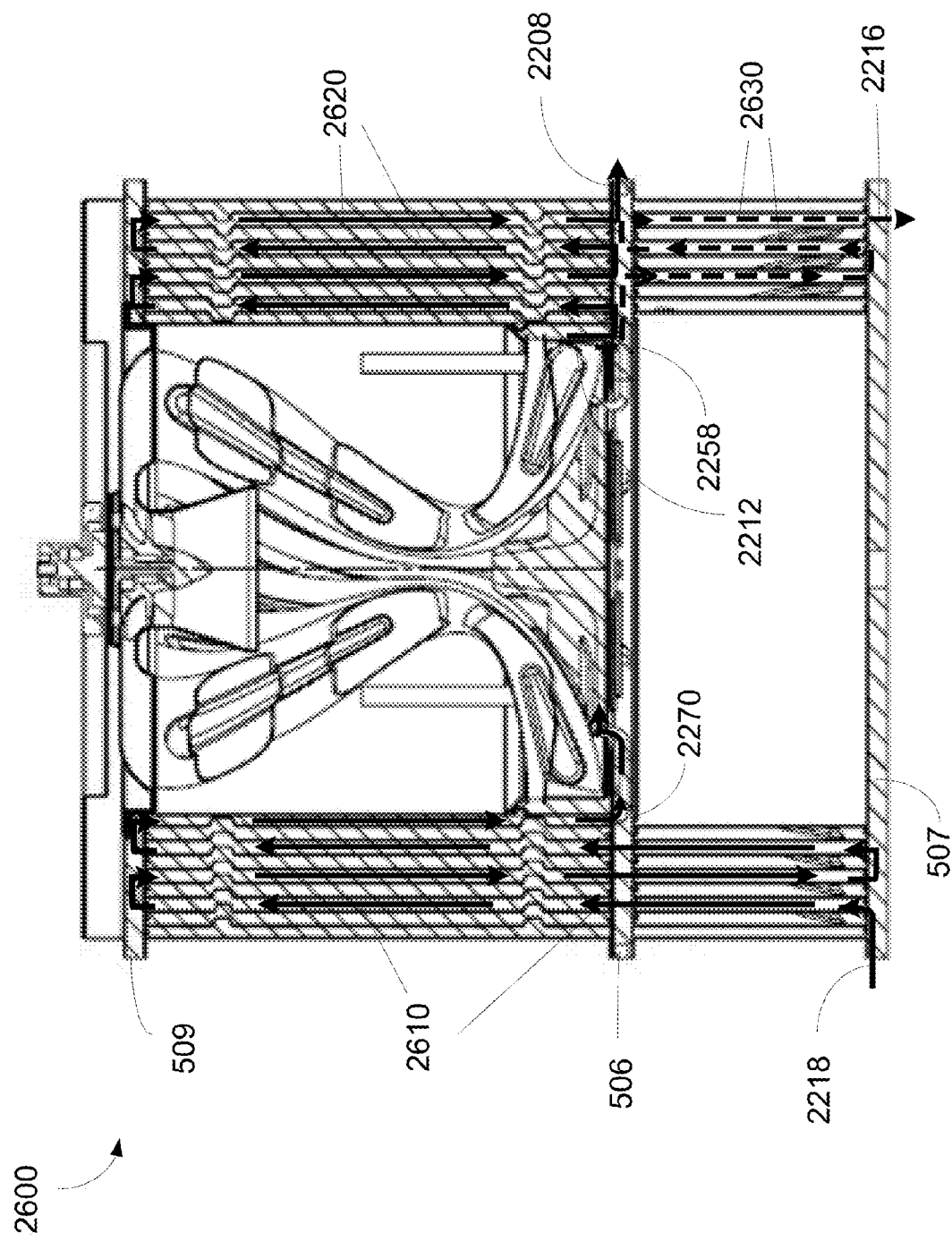
FIG. 26A is a diagram illustrating a cross-section view of HRP system showing hot and cold flows within the HE in accordance with one embodiment of the present invention.

FIG. 26A is a two-dimensional ("2D") diagram 2600 illustrating a cross-section side view of HRP system showing hot and cold flows within the HE in accordance with one embodiment of the present invention. Diagram 2600 is similar to diagram 1400 shown in FIG. 14 except that diagram 2600 shows hot and cold liquid flows. Cold incoming flow 2218 flows through cold flow path as indicated by arrows 2610. The cold flow path, for example, is interlaced with the hot flow path facilitating hot processed liquid flow indicated by arrows 2620.

In one embodiment, cold liquid flow 2218 enters HE via lower manifold 507 and exits HE via outlet 2270 before entering the main boiler. Purified liquid flow leaves the main boiler via inlet 2212 before entering the top HE. Cool purified liquid flow 2208 leaves the top HE via center manifold 506. Waste liquid flow leaves the main boiler via inlet 2258 before entering the bottom HE. After traveling through the bottom HE, waste liquid flow 2216 leaves the bottom HE via lower manifold 507.

Figure 26B:
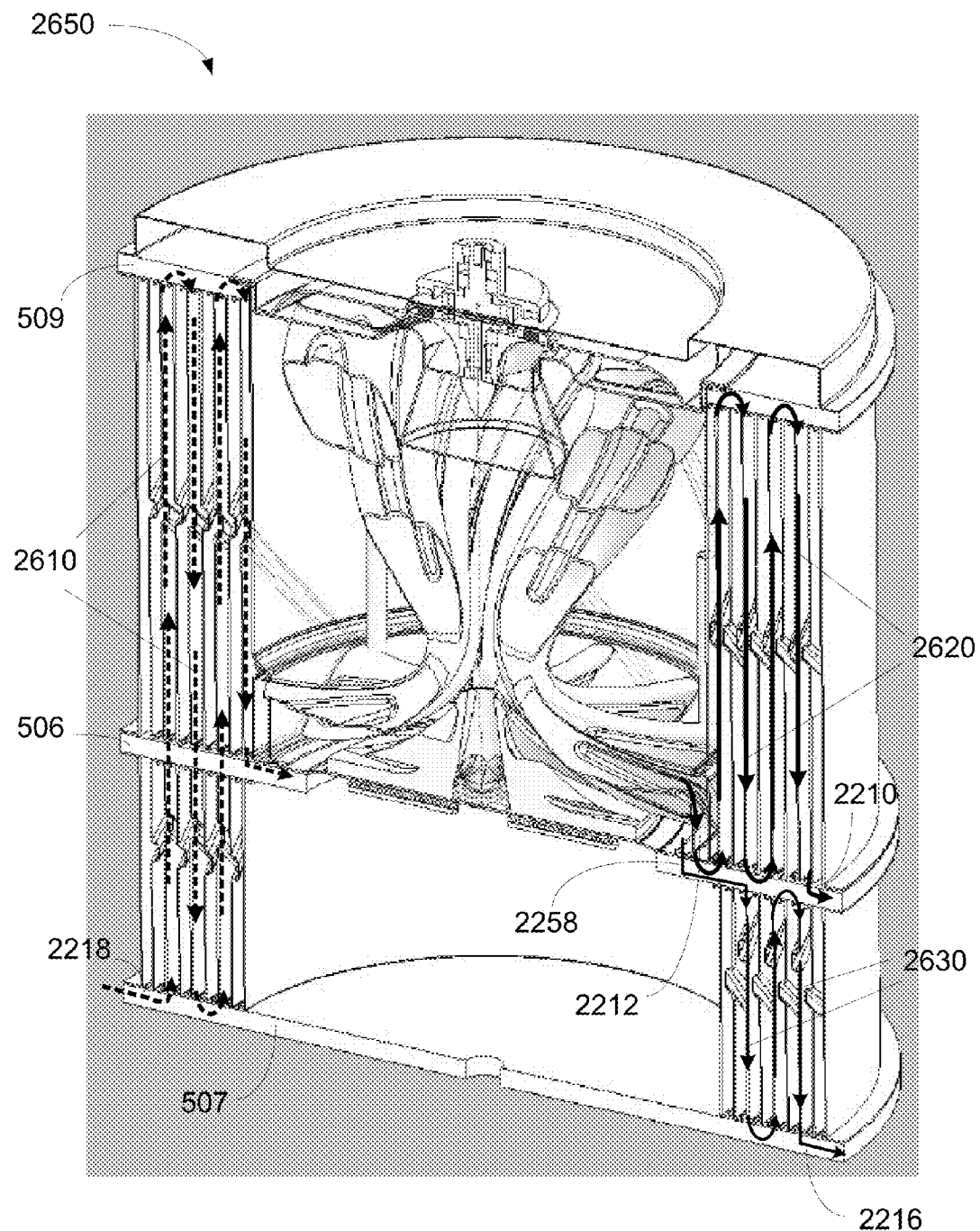
FIG. 26B is a 3D diagram illustrating a cross-section view of HRP system showing liquid flows within HE in accordance with one embodiment of the present invention.

FIG. 26B is a 3D diagram 2650 illustrating a cross-section side-view of HRP system showing liquid flows within HE in accordance with one embodiment of the present invention. Diagram 2650 is similar or the same as diagram 2600 shown in FIG. 26A except that diagram 2650 shows a 3D perspective. It should be noted that the underlying concept of the exemplary embodiment(s) of the present invention would not change if one or more components (or devices) were added to or removed from diagram 2650.

Figure 27:
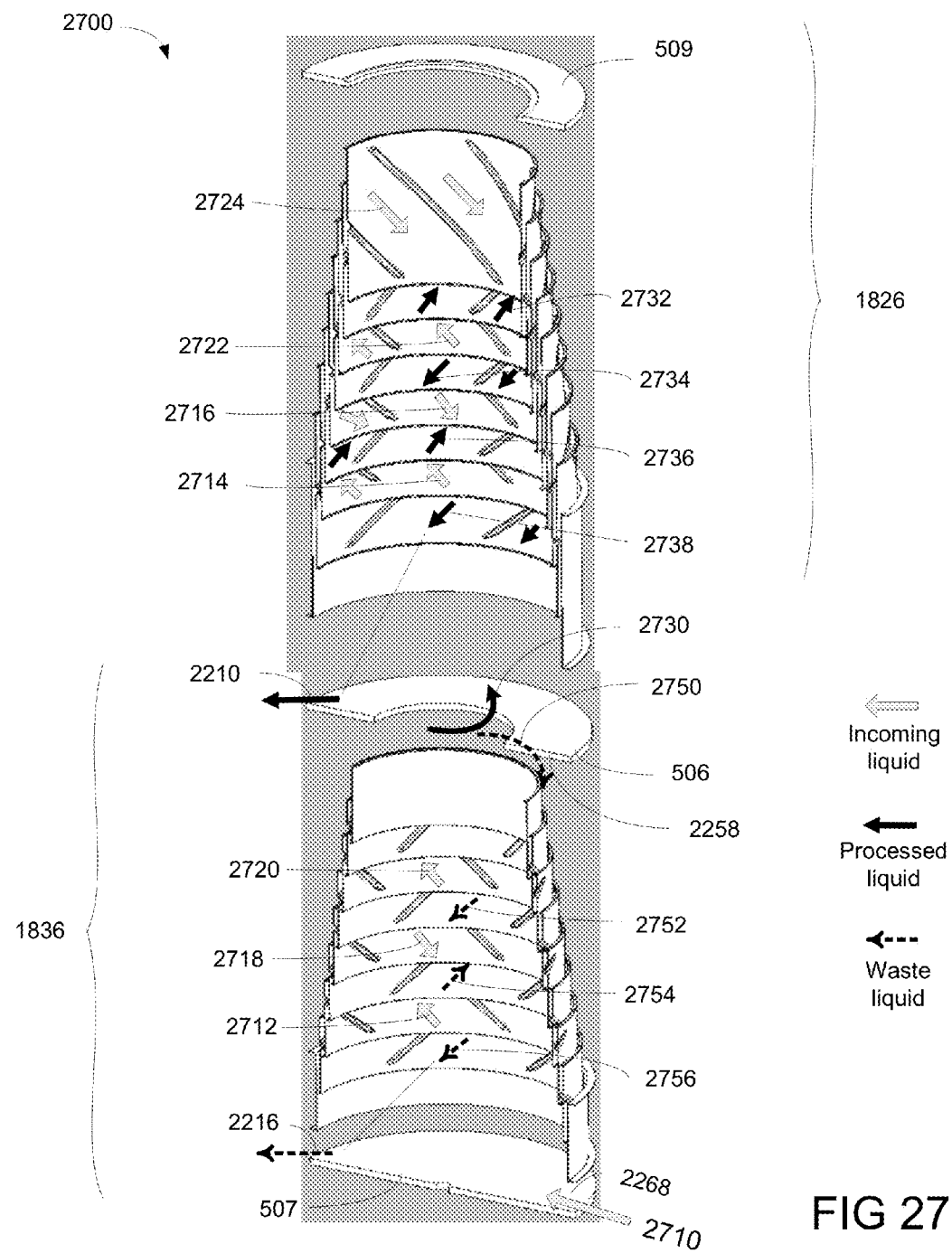
FIG. 27 is a 3D diagram illustrating an HE showing liquid flows in accordance with guide ridges in accordance with one embodiment of the present invention.

FIG. 27 is a 3D diagram 2700 illustrating HE showing liquid flows in accordance with guide ridges in accordance with one embodiment of the present invention. Diagram 2700 includes top HE 1826, bottom HE 1836, upper manifold 509, center manifold 506, and lower manifold 507. HEs 1826 and 1836 contain multiple CSRs forming various flow channels. Diagram 2700 is similar to diagram 2000 shown in FIG. 20 except that diagram 2700 shows an exemplary flow patterns or flow paths.

Unprocessed cold incoming liquid 2710 enters HE through inlet port 2268 located at bottom HE 1836. Cold incoming liquid 2710 flows upwards as flow 2712 and passes through center manifold 506 becoming flow 2714 at top HE 1826. When flow 2714 reaches to upper manifold 509, it turns around moving down wards in response to connector(s) at upper manifold 509 and becomes flow 2716. Flow 2716 goes through center manifold 506 to continue moving through bottom HE 1836 as flow 2718. When flow 2718 reaches to lower manifold 507, it turns around moving upwards as flow 2720. Flow 2720 passes through center manifold 506 and enters top HE 1826 as flow 2722. When flow 2722 turns around as flow 2724 and moves downward as directed by connector(s), flow 2724 exits top HE 1826 and enters the main boiler for purification process. Note that all incoming liquid flows are flowing in a consistent circular orientation such as a counter-clockwise direction viewing from the top of HE.

Hot processed liquid flow 2730 exits from the boiler and enters top HE 1826. Process liquid flow path starts to flow upward as flow 2732. When flow 2732 reaches to upper manifold 509, it begins to flow downward as flow 2734. Upon reaching to center manifold 506, flow 2734 starts to flow upward as flow 2736. After reaching to upper manifold 509, it turns around flowing downward as flow 2738. Upon reaching outlet port 2210, flow 2738 exits top HE 1826.

Hot waste liquid flow 2750 enters bottom HE 1836 from inlet port(s) 2258. When flow 2750 begins to travel in bottom HE 1836 as flow 2752 in a downward direction, flow 2752 reaches to lower manifold 507. Flow 2752 turns around traveling upwards as flow 2754 in response to connectors in lower manifold 507. After reaching center manifold 506, it turns around as flow 2756 in response to connectors at center manifold 506. When flow 2756 reaches to outlet port, flow leaves bottom HE 1836 as waste liquid flow 2216 such as waste water.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A liquid processing system having a heat reclaiming device, comprising:
   a first set of thermal conductive channels ("TCC") configured in a first heat exchanger having a cylindrical shape surrounding a main boiler and operable to guide a first liquid flow to flow through the first heat exchanger, wherein the main boiler is situated approximately in center of the cylindrical shape of the first set of TCC;
   a second set of TCC configured in a second heat exchanger having a cylindrical shape and operable to guide a second liquid flow to flow through the second heat exchanger;
   a manifold situated between the first heat exchanger and the second heat exchanger;
   a third set of TCC configured to thermally coupled to the first set of TCC to guide a third liquid flow, wherein the third liquid flow flows through the third set of TCC adjacent to the first set of TCC which transfers heat from the first liquid flow to the third liquid flow via the first set of TCC and the third set of TCC.

2. The system of claim 1, wherein the third set of TCC is further thermally coupled to the second set of TCC through the manifold allowing the third liquid flow to travel from one side of manifold to another side of manifold to absorb heat from the second liquid flow via the second set of TCC and the third set of TCC.

3. The system of claim 2, wherein the first set of TCC includes a plurality of first concentric cylinders wherein the plurality of first concentric cylinders are configured to form at least a portion of a top heat exchanger ("HE") configured to accumulate heat from the main boiler and wherein the top heat exchanger is a first heat exchanger.

4. The system of claim 3, wherein each of the plurality of first concentric cylinders has a unique diameter forming a hollow column, wherein a first concentric cylinder with smallest diameter is situated adjacent to the main boiler while a first concentric cylinder with largest diameter is situated at outmost of the top HE.

5. The system of claim 4,
   wherein the top HE includes a hot conduit which includes the first set of TCC and a cold conduit which includes a portion of the third set of TCC; and
   wherein a cold liquid flow traveling through the cold conduit is able to absorb heat from a hot liquid flow passing through the hot conduit.

6. The system of claim 5, wherein the cold liquid flow is room temperature water stream and the hot liquid flow is purified water stream.

7. The system of claim 3, wherein the second set of TCC includes a plurality of second concentric cylinders configured to form at least a portion of a bottom heat exchanger ("HE") wherein the second heat exchanger is a bottom heat exchanger.

8. The system of claim 7,
   wherein each of the plurality of second concentric cylinders has a unique diameter allowing larger second concentric cylinder to house smaller second concentric cylinder to form a column formation; and
   wherein the bottom HE includes a hot conduit which includes the second set of TCC and a cold conduit which includes a portion of the third set of TCC able to transfer heat from the hot conduit to the cold conduit.

9. The system of claim 8, wherein the top HE and the bottom HE are configured to direct liquid flows in a plurality of directions.

10. A heat reclaimed purification ("HRP") system able to recover heat, comprising:
    a heat exchanger ("HE") including a first group of cylinders arranged in a concentric nested layers forming a first set of thermal conductive channels ("TCC") and a second set of TCC, the first set of TCC and the second set of TCC arranged in alternative sequence between nested layers for thermal conductivity, the first set of TCC able to carry a first hot liquid flow and the second set of TCC able to carry a cold liquid flow allowing the cold liquid flow to absorb heat from the first hot liquid flow via the first set of TCC and the second set of TCC;
    a boiler situated in center of the HE for liquid purification; and
    a bottom HE coupled to the HE and including a second group of cylinders arranged in a concentric nested layers forming a third set of TCC and a fourth set of TCC, the third set of TCC and the fourth set of TCC arranged in alternative sequence between nested layers for thermal conductivity, the third set of TCC able to carry a second hot liquid flow and the fourth set of TCC able to carry the cold liquid flow allowing the cold liquid flow to absorb heat from the second hot liquid flow via the thermal conductivity.

11. The system of claim 10, wherein the first hot liquid is purified liquid and the second hot liquid is liquid waste containing impurities.

12. The system of claim 11, wherein a cold liquid flow is configured to travel through the HE and the bottom HE to absorb heat from the first hot liquid and the second hot liquid before the cold liquid flow reaching the boiler.

13. The system of claim 12, wherein the boiler includes a turbine, blades, and a heat source configured to purify water generating purified water and liquid waste.

14. The system of claim 13, wherein the HE is configured to direct liquid flows in a plurality of directions.

15. The system of claim 14, wherein the first set of TCC and the second set of TCC are configured to pass each other multiple times for heat exchange.

16. The system of claim 15, wherein the third set of TCC and the fourth set of TCC are configured to pass each other multiple times for heat exchange.

17. A liquid processing system having a heat reclaiming device, comprising:
    a first set of thermal conductive channels ("TCC") configured in a top heat exchanger having a cylindrical shape having a cavity in center of the cylindrical shape for housing a main boiler, the first set of TCC operable to guide a relatively hot liquid flow to flow in a first direction;
    a second set of TCC configured in a lower heat exchanger having a cylindrical shape and operable to guide a relatively warm liquid flow to flow through the lower heat exchanger; and
    a third set of TCC thermally coupled to the first set of TCC to guide a relatively cold liquid flow, wherein the third set of TCC is able to transfer heat from the first set of TCC guiding the relatively hot liquid flow and to the relatively cold liquid flow to heat up the relatively cold liquid flow as it is passing through the third set of TCC.

18. The system of claim 17, wherein the third set of TCC is further thermally coupled to the second set of TCC through a manifold allowing the third liquid flow to travel from one side of the manifold to another side of the manifold to absorb heat from the second liquid flow via the second set of TCC and the third set of TCC.

19. The system of claim 17, wherein the first set of TCC includes a plurality of first concentric cylinders wherein the plurality of first concentric cylinders are configured to form at least a portion of the top heat exchanger ("HE") configured to accumulate heat from the main boiler.

20. The system of claim 17, wherein each of the plurality of first concentric cylinders has a unique diameter forming a hollow column, wherein a first concentric cylinder with smallest diameter is situated adjacent to the main boiler while a first concentric cylinder with largest diameter is situated at outmost of the top HE.

\* \* \* \* \*